US011884065B2

(12) United States Patent
Otoi

(10) Patent No.: US 11,884,065 B2
(45) Date of Patent: Jan. 30, 2024

(54) LIQUID DISCHARGE APPARATUS AND LIQUID DISCHARGE METHOD

(71) Applicant: Yoshihito Otoi, Kanagawa (JP)

(72) Inventor: Yoshihito Otoi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 106 days.

(21) Appl. No.: 17/513,929

(22) Filed: Oct. 29, 2021

(65) Prior Publication Data

US 2022/0134731 A1 May 5, 2022

(30) Foreign Application Priority Data

Oct. 30, 2020 (JP) ................................ 2020-182298
Sep. 15, 2021 (JP) ................................ 2021-149833

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .... B41J 2/16508; B41J 2/16505; B41J 29/38; B41J 2/04586; B41J 2/0451; B41J 25/3086; B41J 2/165; B41J 25/304; B41J 25/3082; B41J 3/4073; B05B 13/041; B05B 13/0431
See application file for complete search history.

(56) References Cited

U.S. PATENT DOCUMENTS

2006/0192798 A1* 8/2006 Kuki ..................... B41J 25/308 347/8
2015/0062240 A1* 3/2015 Kraus ................. B41J 3/40733 347/25

(Continued)

FOREIGN PATENT DOCUMENTS

JP 2010-110083 5/2010
JP 2011-235507 11/2011

(Continued)

OTHER PUBLICATIONS

PCT Application No. IB2021/056264 filed Jul. 13, 2021, Satoshi Kitaoka.

*Primary Examiner* — Jannelle M Lebron
(74) *Attorney, Agent, or Firm* — XSENSUS LLP

(57) ABSTRACT

A liquid discharge apparatus includes a liquid discharge portion having a liquid discharge port and a liquid discharge unit. The liquid discharge portion performs a liquid discharge to discharge a liquid in a liquid discharge direction. The liquid discharge unit holds the liquid discharge portion and is movable along the liquid discharge direction. The liquid discharge apparatus further includes a first driver to move the liquid discharge unit along the liquid discharge direction, a second driver to move the liquid discharge portion relative to the liquid discharge unit along the liquid discharge direction, an abnormality detector to detect an abnormality of the liquid discharge unit, and circuitry. The circuitry increases an excitation current of the first driver in response to an abnormality detection signal from the abnormality detector or an instruction to clean the liquid discharge portion, and drives the second driver after increasing the excitation current.

8 Claims, 21 Drawing Sheets

(56) References Cited

U.S. PATENT DOCUMENTS

| | | | | |
|---|---|---|---|---|
| 2015/0202904 | A1* | 7/2015 | Okuda | B41J 25/304<br>347/8 |
| 2019/0118531 | A1* | 4/2019 | Muhl | B41J 25/006 |
| 2021/0291514 | A1 | 9/2021 | Kitaoka | |

FOREIGN PATENT DOCUMENTS

| | | |
|---|---|---|
| JP | 2012-222916 | 11/2012 |
| JP | 2018-001715 | 1/2018 |

* cited by examiner p1
p2
p3
p4
100
X1
X2
X3
Z1
Z2
Z3
X-AXIS DIRECTION
EXCITATION CURRENT OF DRIVE MOTOR
LARGE
MEDIUM
SMALL
X
Y
Z

LIQUID DISCHARGE APPARATUS AND LIQUID DISCHARGE METHOD

CROSS-REFERENCE TO RELATED APPLICATIONS

This patent application is based on and claims priority pursuant to 35 U.S.C. § 119(a) to Japanese Patent Application Nos. 2020-182298, filed on Oct. 30, 2020 and 2021-149833, filed on Sep. 15, 2021, in the Japan Patent Office, the entire disclosure of each of which is hereby incorporated by reference herein.

BACKGROUND

Technical Field

Aspects of the present disclosure relate to a liquid discharge apparatus and a liquid discharge method.

Description of the Related Art

A liquid discharge apparatus includes a carriage including a recording head that discharges liquid, and a driver that moves the carriage in the main scanning direction.

SUMMARY

Embodiments of the present disclosure describe an improved liquid discharge apparatus that includes a liquid discharge portion having a liquid discharge port and a liquid discharge unit. The liquid discharge portion performs a liquid discharge to discharge a liquid in a liquid discharge direction from the liquid discharge port toward an object. The liquid discharge unit holds the liquid discharge portion and is movable along the liquid discharge direction. The liquid discharge apparatus further includes a first driver to move the liquid discharge unit along the liquid discharge direction, a second driver to move the liquid discharge portion relative to the liquid discharge unit along the liquid discharge direction, an abnormality detector to detect an abnormality of the liquid discharge unit, and circuitry. The circuitry increases an excitation current of the first driver in response to an abnormality detection signal from the abnormality detector or an instruction to clean the liquid discharge portion, and drives the second driver after increasing the excitation current.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1B:
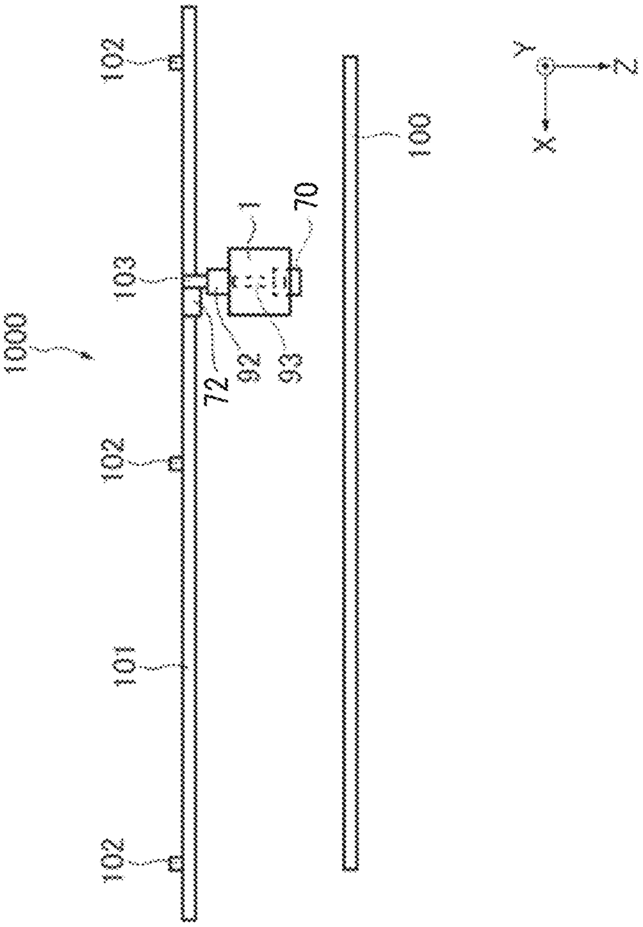
FIGS. 1A and 1B are schematic views illustrating an overall configuration of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a," "an," and "the" are intended to include the plural forms as well, unless the context clearly indicates otherwise.

It is to be noted that the suffixes Y, M, C, K, W, and S attached to each reference numeral indicate only that components indicated thereby are used for forming yellow, magenta, cyan, black, white and spot color images, respectively, and hereinafter may be omitted when color discrimination is not necessary.

Figure 1A:
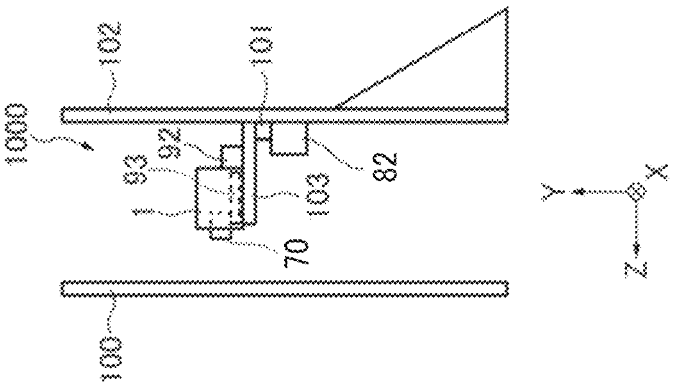

FIGS. 1A and 1B are schematic views illustrating an overall configuration of a liquid discharge apparatus 1000 according to an embodiment of the present disclosure. FIG. 1A is a side view, and FIG. 1B is a plan view of the liquid discharge apparatus 1000.

The liquid discharge apparatus 1000 is installed so as to face an object 100 on which images are drawn. The liquid discharge apparatus 1000 includes an X-axis rail 101, a Y-axis rail 102 intersecting the X-axis rail 101, and a Z-axis rail 103 intersecting the X-axis rail 101 and the Y-axis rail 102. Here, an X-axis is an example of a first axis, a Y-axis is an example of a second axis intersecting the first axis, and a Z-axis is an example of a third axis intersecting the first axis and the second axis. The Y-axis rail 102 movably holds the X-axis rail 101 along the Y-axis. The X-axis rail 101 movably holds the Z-axis rail 103 along the X-axis. The Z-axis rail 103 movably holds a carriage 1 along the Z-axis. The carriage 1 is an example of a liquid discharge unit.

Further, the liquid discharge apparatus 1000 includes a first Z-direction driver 92 and an X-direction driver 72. The first Z-direction driver 92 moves the carriage 1 along the Z-axis along the Z-axis rail 103. The X-direction driver 72 moves the Z-axis rail 103 along the X-axis along the X-axis rail 101. The liquid discharge apparatus 1000 further includes a Y-direction driver 82 that moves the X-axis rail 101 along the Y-axis along the Y-axis rail 102. Further, the liquid discharge apparatus 1000 includes a second Z-direction driver 93 that moves a head holder 70 relative to the carriage 1 along the Z-axis. Here, the first Z-direction driver 92 is an example of a first driver, and the second Z-direction driver 93 is an example of a second driver. The head holder 70 is an example of a holder.

The liquid discharge apparatus 1000 described above discharges ink from a head 300 (see FIG. 3) mounted on the head holder 70 toward the object 100 while moving the carriage 1 along the X-axis, the Y-axis, and the Z axis, thereby drawing images on the object 100. The movement of the carriage 1 and the head holder 70 along the Z-axis may not be parallel to the Z-axis, and may be an oblique movement including at least a Z-axis component. Although the object 100 is flat in FIGS. 1A and 1B, the object 100 may have a surface shape which is nearly vertical or a curved surface with the large radius of curvature, such as a body of a car, a truck, or an aircraft.

Figure 2:
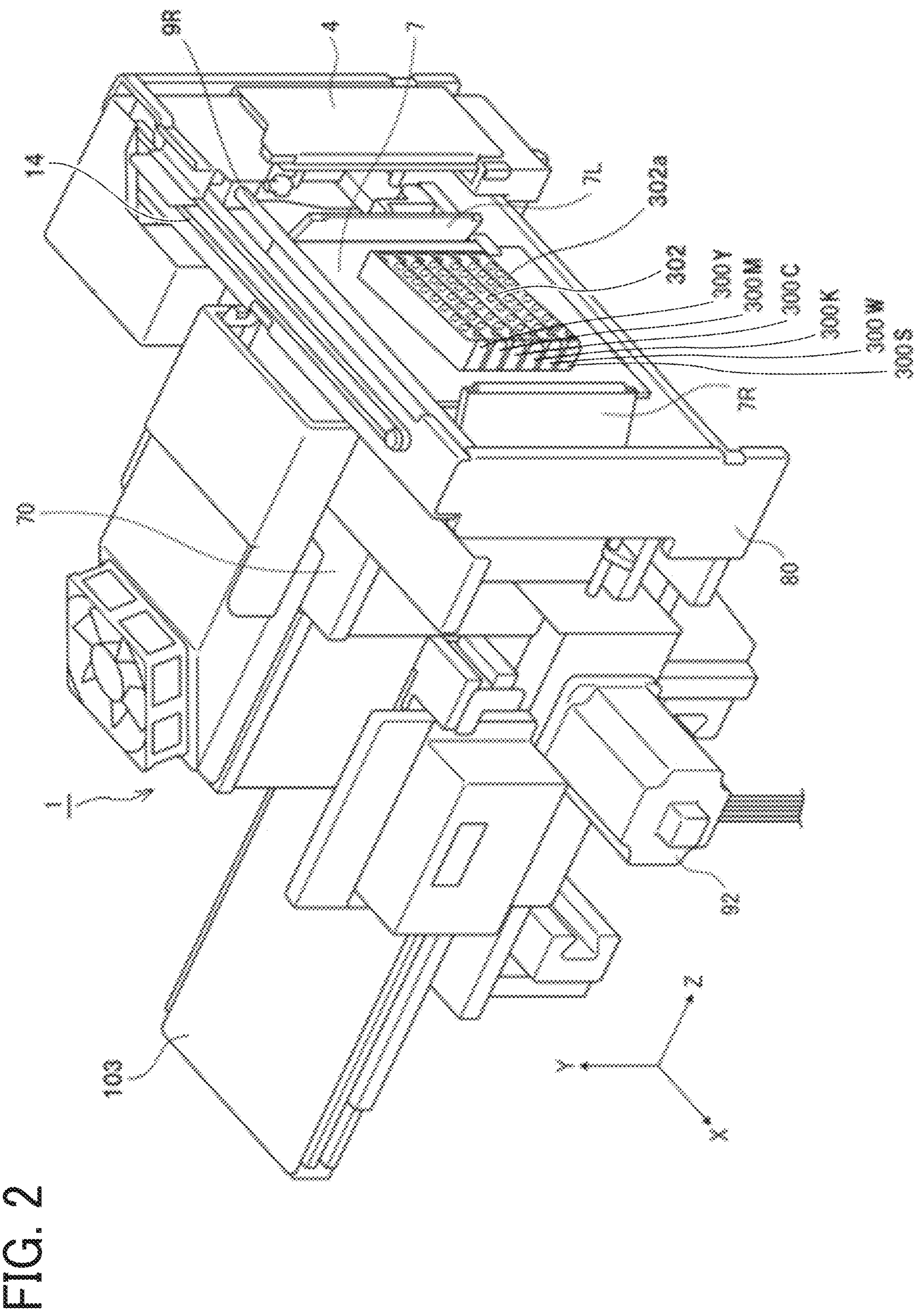
FIG. 2 is a perspective view of a head holder at a standby position on a Z-axis in the liquid discharge apparatus illustrated in FIGS. 1A and 1B.

Next, the configuration of the carriage 1 is described. FIG. 2 is a perspective view of the carriage 1 according to the present embodiment. In FIG. 2, the head holder 70 of the carriage 1 is at a standby position on the Z-axis. The carriage 1, which is an example of a liquid discharge unit, includes a cleaning unit 4, collision detection plates 7L and 7R, and the like in addition to the head holder 70 described above.

The carriage 1 is movable along the Z-axis along the Z-axis rail 103 by driving force of the first Z-direction driver 92. The head holder 70 mounted on the carriage 1 includes a head fixing portion 7 for attaching the head 300. In the present embodiment, a head 300Y for yellow, a head 300M for magenta, a head 300C for cyan, a head 300K for black, a head 300W for white, and a head 300S for spot color are attached to the head fixing portion 7. In the following description, these heads are collectively referred to as heads 300. The head 300 is an example of a liquid discharge portion.

Each of the heads 300 includes a nozzle face 302*a* having a plurality of nozzles 302. The nozzle 302 is an example of a liquid discharge port, and the nozzle face 302*a* is an example of a liquid discharge surface. Note that the types and number of colors of the inks used in the heads 300 are not limited to the above-described example. For example, all inks used in the heads 300 may be the same color. The head 300 is secured to the head fixing portion 7 such that the nozzle face 302*a* intersects the horizontal plane (i.e., X-Z plane) and the plurality of nozzles 302 is obliquely arrayed with respect to the X-axis. Thus, the head 300 discharges ink from the nozzle 302 in a direction (Z-axis direction in the present embodiment) intersecting the direction of gravity.

The cleaning unit 4 cleans the heads 300. The cleaning unit 4 moves parallel to the X-axis along a guide rail 9R secured to a frame 80. A motor that moves the cleaning unit 4 along the guide rail 9R, a position sensor that detects the position of the cleaning unit 4, for example, at a standby position and a return position on the guide rail 9R, and the like are disposed in the frame 80.

With the above configuration, the motor transmits driving force to a belt 14 to move the cleaning unit 4 coupled to the belt 14 in the positive X-axis direction along the guide rail 9R. When the cleaning unit 4 reaches a position facing the nozzles 302, the cleaning unit 4 cleans the nozzles 302 of the head 300. When the cleaning unit 4 further moves in the positive X-axis direction and reaches the return position, the cleaning unit 4 switches the moving direction to the negative X-axis direction and returns to the standby position. Note that, when the cleaning unit 4 returns to the standby position, the cleaning unit 4 may or may not clean the nozzles 302.

In addition, the head holder 70 includes the collision detection plate 7L on the negative side in the X-axis direction and the collision detection plate 7R on the positive side in the X-axis direction with respect to the nozzle face 302*a* of the head 300. Each of the collision detection plate 7L and the collision detection plate 7R includes a shaft parallel to the Y-axis, and the head holder 70 swingably supports the collision detection plate 7L and the collision detection plate 7R around the shafts. A position sensor detects the position of the collision detection plate 7L and the collision detection plate 7R. As the position sensor detects that the collision detection plate 7L or the collision detection plate 7R moves, the position sensor outputs a detection signal. Here, the collision detection plate 7L and the collision detection plate 7R are an example of an abnormality detector.

Figure 3:
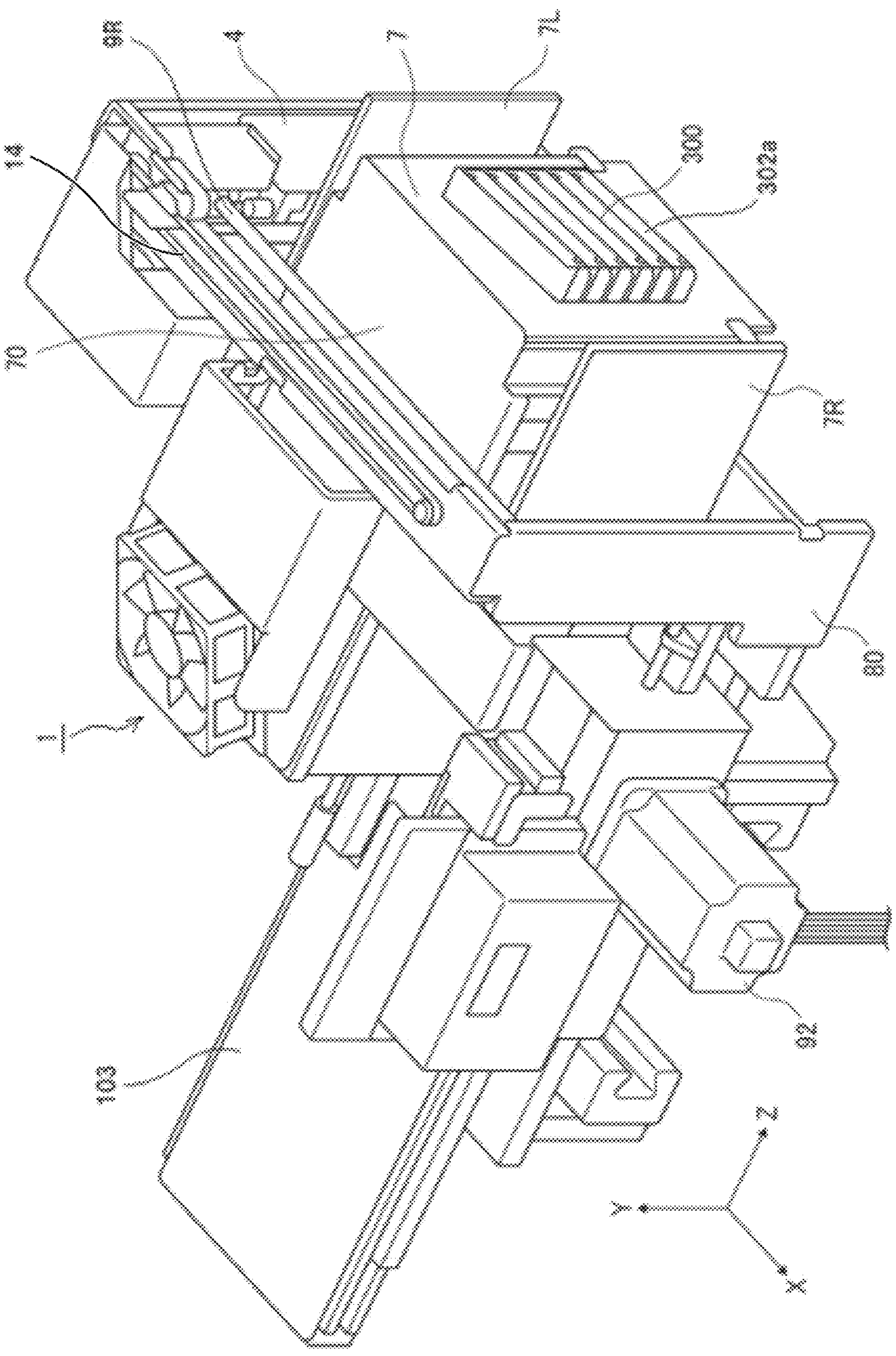
FIG. 3 is a perspective view illustrating a state in which the head holder has moved in the positive Z-axis direction.

FIG. 3 is a perspective view of the carriage 1 according to the present embodiment. In FIG. 3, the head holder 70 of the carriage 1 has moved in the positive Z-axis direction. The head holder 70 is movable along the Z-axis relative to the carriage 1. The head holder 70 moves along the Z-axis between an ink discharge position illustrated in FIG. 3 at which ink is discharged toward the object 100 and a standby position illustrated in FIG. 2 at which the head 300 is retracted from the object 100 compared with the ink discharge position. The first Z-direction driver 92 includes a drive motor to drive the entire carriage 1 along the Z-axis. The second Z-direction driver 93 includes a power cylinder to drive the head holder 70 relative to the carriage 1 along Z-axis. The configuration of the second Z-direction driver is described later.

In FIG. 3, a distal end of each of the collision detection plate 7L and the collision detection plate 7R projects to the same position as a surface position of the nozzle face 302*a* or to a position closer to the object 100 than the surface position of the nozzle face 302*a* along the Z-axis. When a collision object is present on the surface of the object 100, the collision detection plate 7L or the collision detection plate 7R detects the collision object such as a protrusion with which the head 300 may collide.

For example, when the carriage 1 moves in the positive X-axis direction relative to the object 100, if the collision detection plate 7R comes into contact with a protrusion on the surface of the object 100, the collision detection plate 7R detects the collision with the protrusion and outputs a collision detection signal. In response to the collision detection signal, the head holder 70 moves back to the standby position to avoid collision between the head 300 and the protrusion on the object 100.

Figure 4:
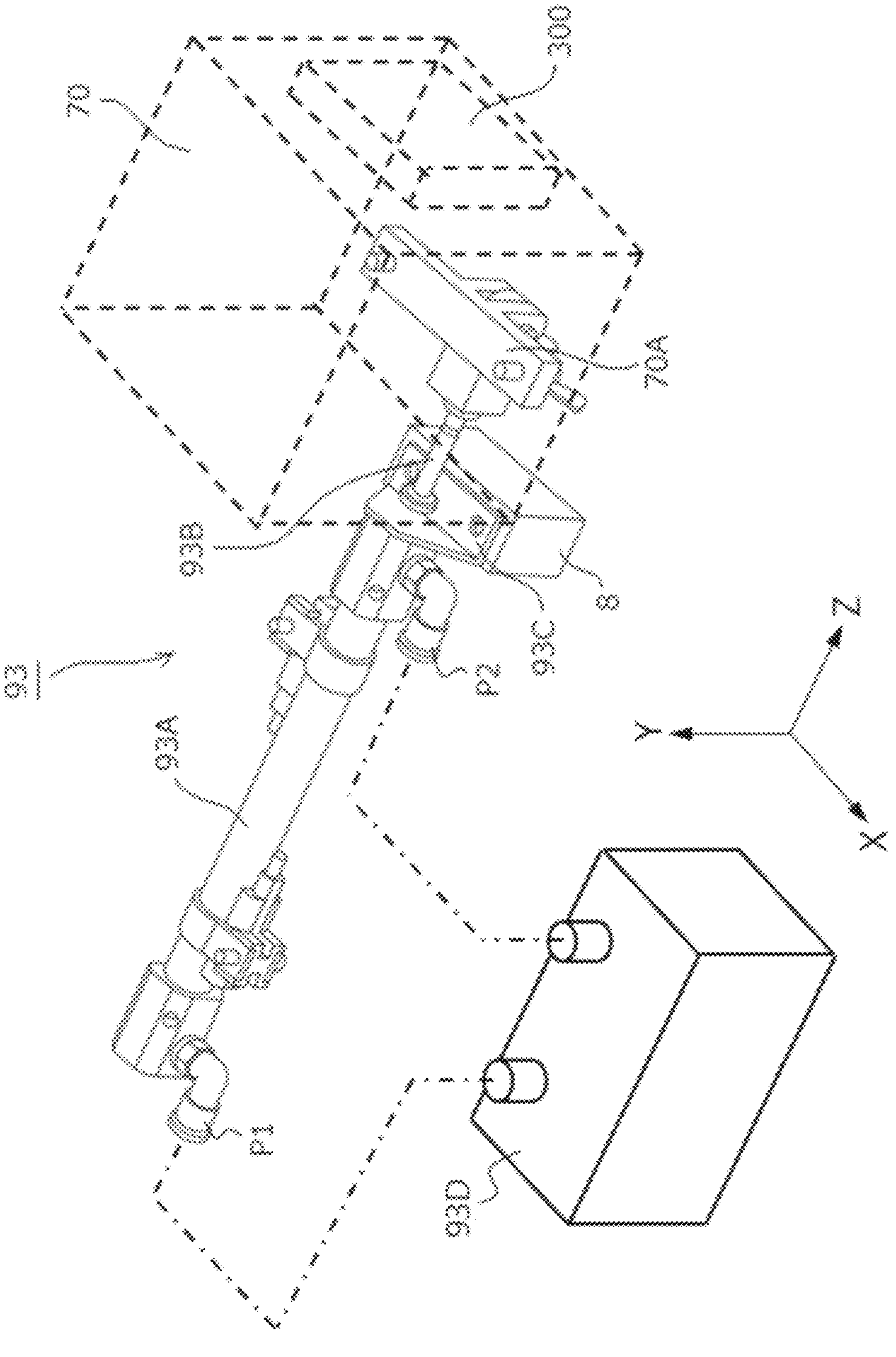
FIG. 4 is a perspective view of a second Z-direction driver of the liquid discharge apparatus.

FIG. 4 is a perspective view of the second Z-direction driver 93 according to the present embodiment. As described above, the second Z-direction driver 93 that drives the head holder 70 relative to the carriage 1 along the Z-axis includes the power cylinder. In the second Z-direction driver 93, various types of the power cylinders such as a pneumatic type, an oil hydraulic type, a water hydraulic type, and an electric type can be used. In the present embodiment, a pneumatic cylinder (air cylinder) is used. The air cylinder illustrated in FIG. 4 is a double-acting air cylinder and has two ports P1 and P2 to which air pressure is applied. The port P1 and the port P2 are connected to an air solenoid valve 93D.

For example, when the air solenoid valve 93D is turned off, air is supplied to the port P1 and discharged from the port P2, and the second Z-direction driver 93 moves a piston 93B in the positive Z-axis direction in which the piston 93B is pushed out relative to a cylinder body 93A. Contrary to the above-description, when the air solenoid valve 93D is turned on, air is supplied to the port P2 and discharged from the port P1, and the second Z-direction driver 93 moves the piston 93B in the negative Z-axis direction in which the piston 93B is pulled into the cylinder body 93A. Thus, the second Z-direction driver 93 turns on and off the air solenoid valve 93D to switch between the air supply and air discharge of the ports P1 and P2, thereby switching the operation direction of the piston 93B.

The cylinder body 93A includes an attachment portion 93C for attaching the cylinder body 93A to a housing 8 of the carriage 1. A support 70A that supports the head holder 70 holding the head 300 is provided at an end of the piston 93B. With the above-described configuration, the second Z-direction driver 93 moves the piston 93B back and forth along the Z-axis in response to control of the air solenoid valve 93D by a controller 500 (see FIG. 6). Thus, the head holder 70 moves along the Z-axis. The driving source of the second Z-direction driver 93 is not limited to the power cylinder. The second Z-direction driver 93 may include other types of actuators, such as a drive motor, that can urgently retract the head 300 when an abnormality occurs.

Figure 5B:
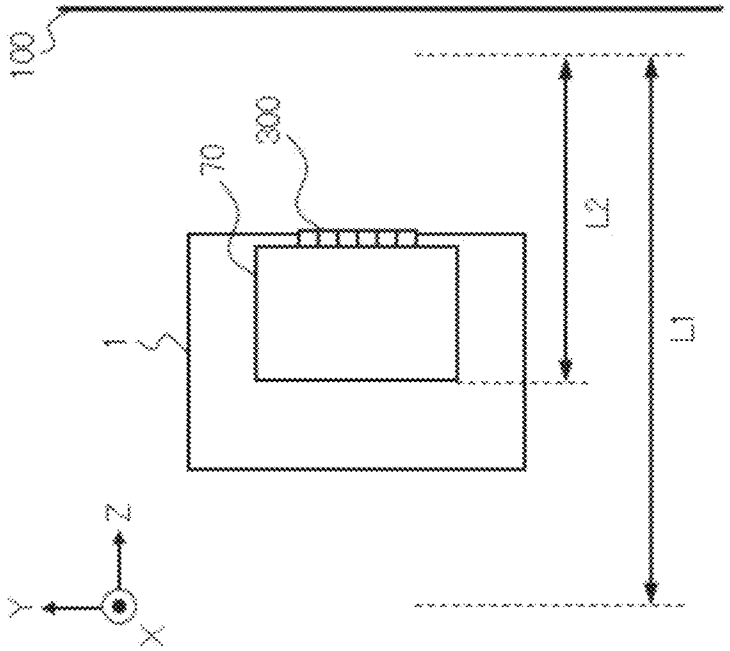
FIGS. 5A and 5B are schematic views illustrating an operation of the head holder along the Z-axis.
Figure 5A:
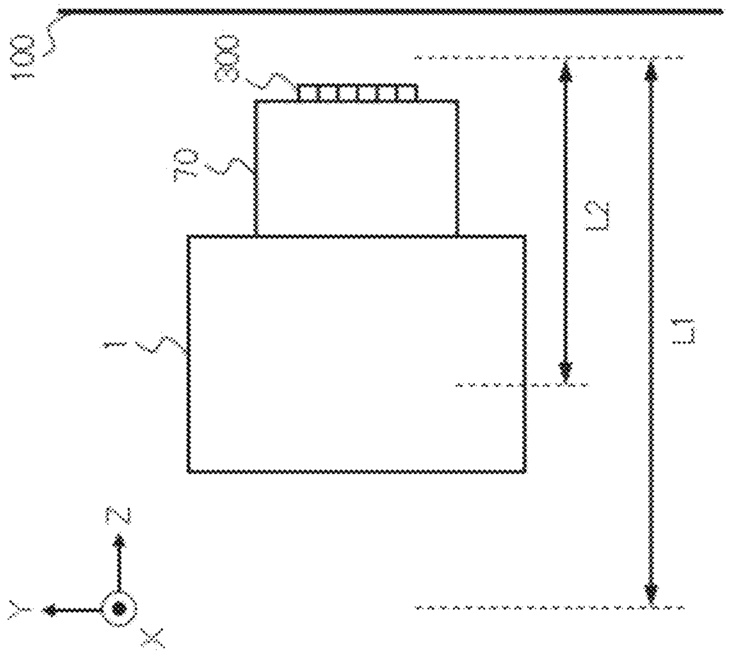

FIGS. 5A and 5B are schematic views illustrating an operation of the head holder 70 along the Z-axis. FIG. 5A is the schematic view of the head holder 70 at the ink discharge position on the Z-axis, and FIG. 5B is the schematic view of the head holder 70 at the standby position on the Z-axis. The carriage 1 is moved on the Z-axis within a range L1 by the drive motor of the first Z-direction driver 92. The head holder 70 holding the head 300 is moved on the Z-axis relative to the carriage 1 within a range L2 by the air cylinder of the second Z-direction driver 93.

When ink is discharged to the object 100 (i.e., ink discharge), and when the position of the object 100 is measured to create three dimensional coordinate data (hereinafter also referred to as body data) indicating the surface shape of the object 100 (i.e., position measurement), the head holder 70 is moved in the positive Z-axis direction as illustrated in FIG. 5A. Thus, the liquid discharge apparatus 1000 keeps the head 300 close to the object 100. On the other hand, when the collision detection plate 7L or 7R detects the collision with the object 100 during the ink discharge or the position measurement, and when the head 300 is cleaned, the head holder 70 is moved in the negative Z-axis direction as illustrated in FIG. 5B. Thus, the liquid discharge apparatus 1000 keeps the head 300 away from the object 100.

When an abnormality occurs, the head holder 70 rapidly moves from the position illustrated in FIG. 5A to the position illustrated in FIG. 5B to urgently retract the head 300 from the object 100. Accordingly, the impact of the operation of the head holder 70 is transmitted to the carriage 1, and the driving motor of the first Z-direction driver 92 may slightly rotate due to the impact.

The drive motor used in the first Z-direction driver 92, such as a stepping motor, can control the position (rotation angle) thereof. If the drive motor rotates due to the impact described above, an encoder that generates the drive pulse of the drive motor deviates from the proper position. Therefore, when the ink discharge is restarted, the number of drive pulses of the drive motor may not synchronize with the position of the head 300 relative to the object 100, and a correct gap may not be formed between the object 100 and the head 300. That is, the carriage 1 may deviate from the proper position on the Z-axis rail 103 (i.e., a loss of synchronization) due to the impact of the operation of the head holder 70.

Therefore, in the present embodiment, the second Z-direction driver 93 is driven after an excitation current of the first Z-direction driver 92 is increased. As a result, a torque against an external force (e.g., the impact described above) is generated in the first Z-direction driver 92, thereby increasing a holding force for retaining a stop position of the first Z-direction driver 92, so that the loss of synchronization of the carriage 1 can be prevented. In addition, since the excitation current of the first Z-direction driver 92 is switched in accordance with the driving of the second Z-direction driver 93, power consumption can be significantly reduced as compared with the case in which the excitation current is constantly set high.

Figure 6:
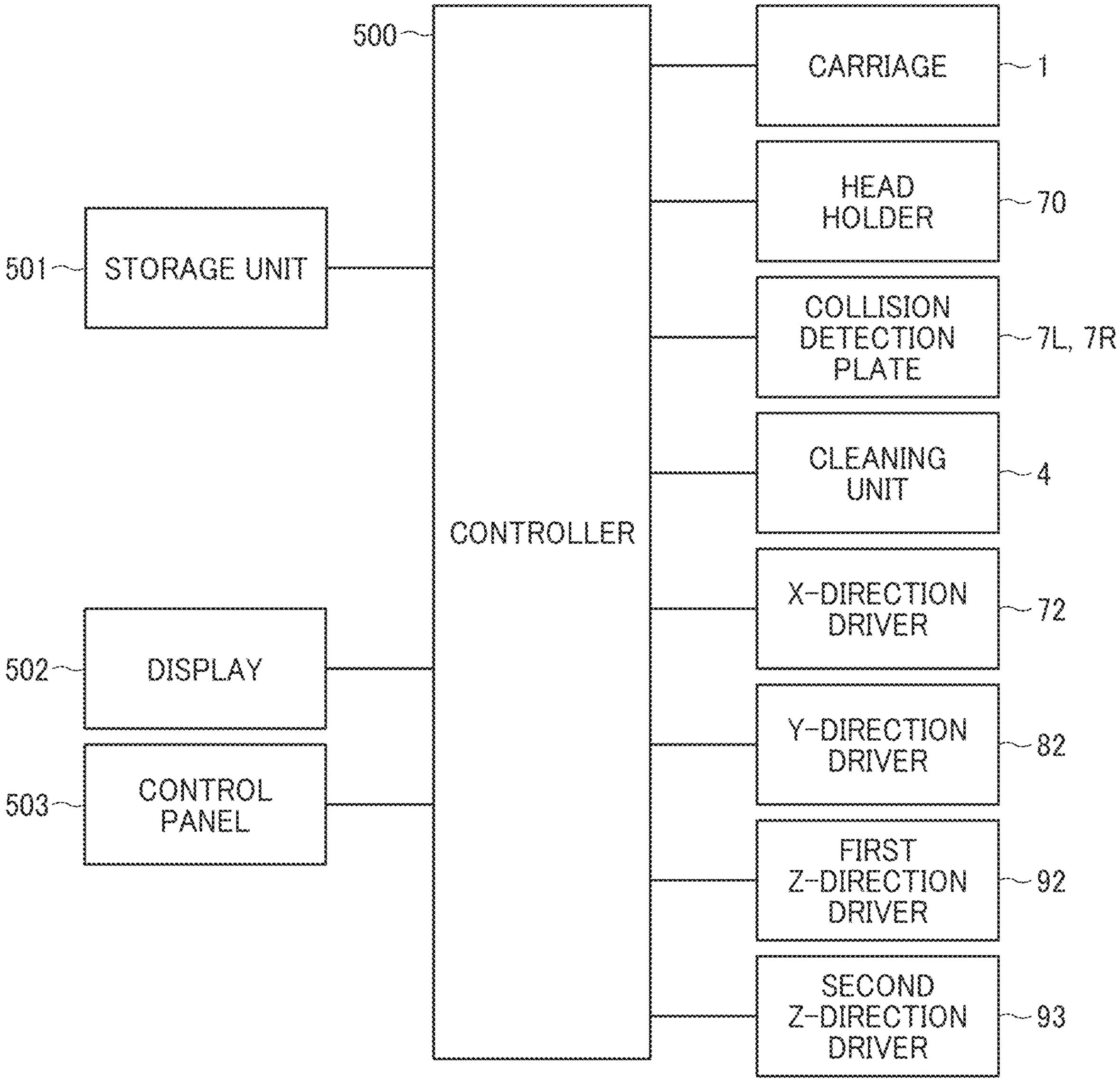
FIG. 6 is a block diagram of a portion of the liquid discharge apparatus related to movement control of a carriage.

FIG. 6 is a block diagram of a portion related to movement control of the carriage 1 according to the present embodiment. The liquid discharge apparatus 1000 includes the carriage 1, the head holder 70, the collision detection plates 7L and 7R, the cleaning unit 4, the X-direction driver 72, the Y-direction driver 82, the first Z-direction driver 92, the second Z-direction driver 93, the controller 500, the storage unit 501, a display 502, and a control panel 503.

The carriage 1 is movable along the X-axis, Y-axis, and Z-axis relative to the object 100, and includes the head holder 70, the collision detection plates 7L and 7R, the cleaning unit 4, and the second Z-direction driver 93. The head holder 70 is movable along the Z-axis relative to the carriage 1 and includes the head 300 that discharges ink toward the object 100.

When the liquid discharge apparatus 1000 performs the ink discharge of the head 300 or the position measurement of the head holder 70 relative to the object 100, the collision detection plates 7L and 7R detect a contact (collision) of the head holder 70 with the object 100. When detecting the contact (collision), the collision detection plates 7L and 7R transmit the collision detection signal indicating the contact (collision) to the controller 500.

The cleaning unit 4 cleans the head 300 based on an instruction from the controller 500. The X-direction driver 72 drives the carriage 1 along the X-axis based on an instruction from the controller 500. The Y-direction driver 82 drives the carriage 1 along the Y-axis based on an instruction from the controller 500. The first Z-direction driver 92 drives the carriage 1 along the Z-axis based on an instruction from the controller 500. The second Z-direction driver 93 drives the head holder 70 relative to the carriage 1 along the Z-axis based on an instruction from the controller 500.

The controller 500 includes a central processing unit (CPU), a read-only memory (ROM), a random access memory (RAM), and an interface (I/F). The CPU controls the entire liquid discharge apparatus 1000. The ROM stores programs, which include a program to cause the CPU to perform the control of a drawing operation, for example, and other fixed data. The RAM temporarily stores drawing data including patterns and characters drawn on the object 100, body data such as the surface shape of the object 100, and the like. The I/F is used when the controller 500 receives drawing data and the like from a host such as a personal computer (PC) to transmits data and signals. The controller 500 is an example of circuitry.

The controller 500 causes the X-direction driver 72, the Y-direction driver 82, the first Z-direction driver 92, and the second Z-direction driver 93 to drive the carriage 1 and the head holder 70. In addition, the controller 500 causes the head 300 included in the head holder 70 to discharge ink and causes the cleaning unit 4 to clean the head 300. Further, when an abnormality occurs in the operations of the carriage 1, the head holder 70, and the head 300, the controller 500 displays information indicating the abnormality to a user on the display 502. The controller 500 receives an instruction from the control panel 503.

The storage unit 501 stores, for example, position data (three dimensional coordinates on the X, Y, and Z axes) indicating a position where the contact (collision) of the collision detection plates 7L and 7R occurs. When an abnormality occurs in the liquid discharge apparatus 1000, the display 502 displays the information indicating the abnormality to the user. The control panel 503 is used to input a value (coordinates) for specifying an area (drawing area) where ink is discharged onto the object 100, a moving speed of the carriage 1, drawing data and three dimensional coordinates (body data) used for drawing on the object 100, a distance between the head 300 and the object 100, and the like. Note that the display 502 and the control panel 503 may be combined into one screen with a touch panel or the like.

As described above, the liquid discharge apparatus 1000 according to the present embodiment includes the head 300 having the nozzles 302 that discharges ink toward the object 100, and the carriage 1 that holds the head 300 and is movable in the direction (Z-axis direction) in which ink is discharged from the nozzles 302 toward the object 100. The liquid discharge apparatus 1000 further includes the first Z-direction driver 92 that moves the carriage 1 along the Z-axis, the second Z-direction driver 93 that moves the head 300 relative to the carriage 1 along the Z-axis, and the controller 500 that drives the second Z-direction driver 93 after increasing the excitation current of the first Z-direction driver 92. Accordingly, the liquid discharge apparatus 1000 that reduces power consumption in operation can be provided.

The first Z-direction driver 92 includes the drive motor. Thus, the carriage 1 can be finely moved relative to the object 100. The second Z-direction driver 93 includes the power cylinder. Thus, the head 300 can be moved at high speed relative to the carriage 1.

Figure 7:
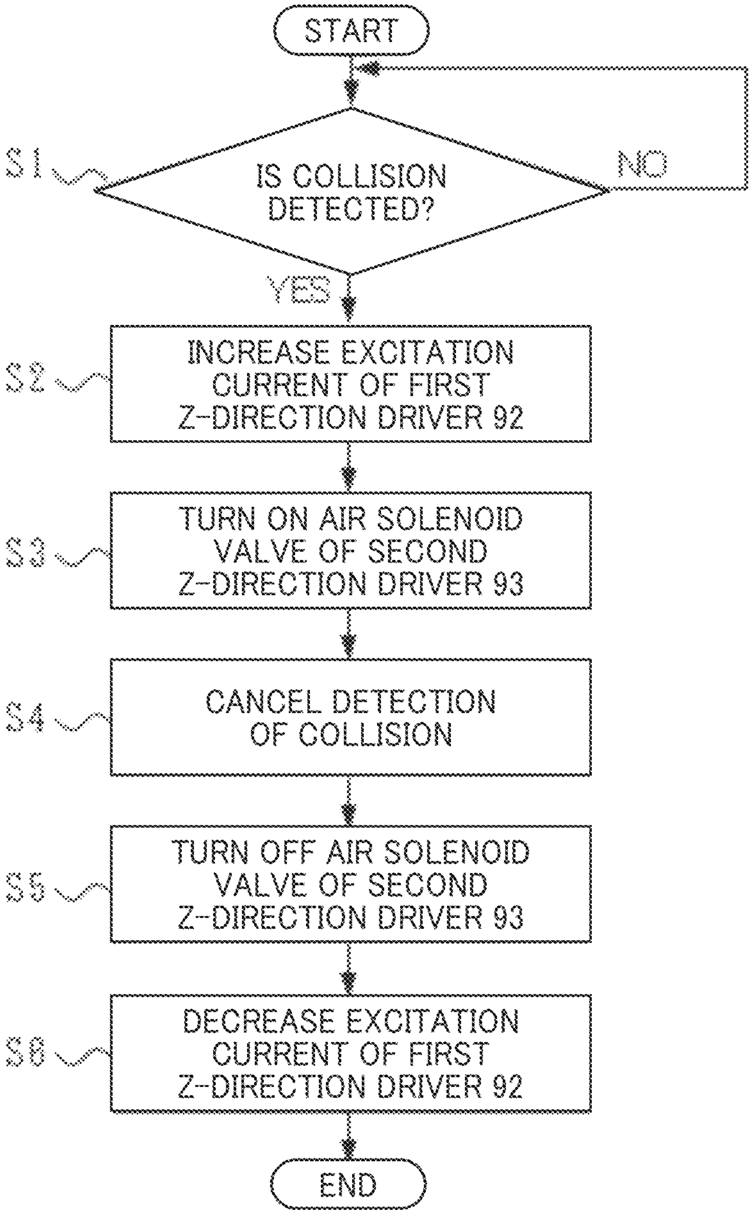
FIG. 7 is a flowchart illustrating a control flow of first and second Z-direction drivers during collision detection according to an embodiment of the present disclosure.

FIG. 7 is a flowchart illustrating a control flow of the first and second Z-direction drivers 92 and 93 during collision detection according to the present embodiment. When the carriage 1 moves along the X-axis relative to the object 100, if the collision detection plate 7L or the collision detection plate 7R collides with a collision object such as a protrusion on the object 100, the collision detection plates 7L or 7R detects the collision (step S1).

When the collision detection plate 7L or the collision detection plate 7R detects the collision, the controller 500 receives the collision detection signal. Then, based on the received collision detection signal, the controller 500 increases the excitation current of the drive motor of the first Z-direction driver 92 to a larger value than the previous excitation current (step S2). As a result, the torque of the drive motor against the external force increases, thereby increasing the holding force for retaining the stop position of the drive motor.

With the excitation current of the drive motor of the first Z-direction driver 92 increased, the controller 500 turns on the air solenoid valve 93D of the second Z-direction driver 93 (step S3). As a result, the piston 93B of the air cylinder of the second Z-direction driver 93 moves in the direction in which the piston 93B is pulled into the cylinder body 93A. As the piston 93B moves, the head holder 70 attached to the end of the piston 93B moves to the standby position on the Z-axis to avoid the collision of the head 300 with the collision object such as the protrusion on the object 100.

After the head holder 70 is retracted to the standby position on the Z-axis, a user handles the collision object detected by the collision detection plate 7L or the collision detection plate 7R. As the collision object has been handled, the controller 500 cancels the detection of collision with the collision object (step S4).

As the detection of collision has been canceled, the controller 500 turns off the air solenoid valve 93D of the second Z-direction driver 93 (step S5). As a result, the piston 93B of the air cylinder of the second Z-direction driver 93 moves in the direction in which the piston 93B is pushed out relative to the cylinder body 93A. As the piston 93B moves, the head holder 70 attached to the end of the piston 93B moves to the ink discharge position on the Z-axis at which ink can be discharged.

As the head holder 70 reaches the ink discharge position, the controller 500 decreases the excitation current of the drive motor of the first Z-direction driver 92 to the previous excitation current of the drive motor before the collision object is detected (step S6).

Figure 8:
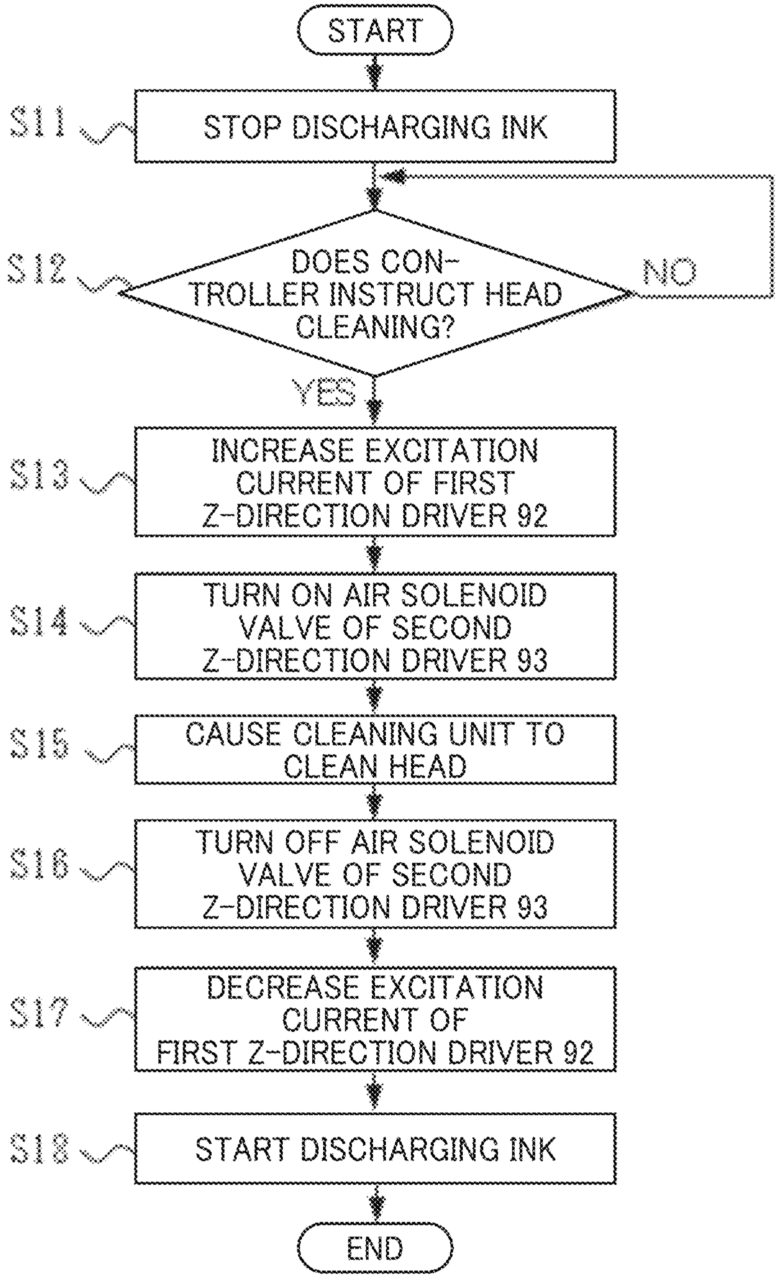
FIG. 8 is a flowchart illustrating a control flow of the first and second Z-direction drivers during head cleaning according to an embodiment of the present disclosure.

FIG. 8 is a flowchart illustrating a control flow of the first and second Z-direction drivers 92 and 93 during head cleaning according to the present embodiment. As the liquid discharge apparatus 1000 finishes drawing on the object 100, the controller 500 causes the head 300 to stop discharging ink (step S11).

When the head 300 is cleaned while not discharging ink, the controller 500 instructs to clean the head 300 of the carriage 1 (step S12). The controller 500 instructs the cleaning unit 4 to clean the head 300 and increases the excitation current of the drive motor of the first Z-direction driver 92 to a larger value than the previous excitation current (step S13). As a result, the torque of the drive motor against the external force increases, thereby increasing the holding force for retaining the stop position of the drive motor.

With the excitation current of the drive motor of the first Z-direction driver 92 increased, the controller 500 turns on the air solenoid valve 93D of the second Z-direction driver 93 (step S14). As a result, the piston 93B of the air cylinder of the second Z-direction driver 93 moves in the direction in which the piston 93B is pulled into the cylinder body 93A. As the piston 93B moves, the head holder 70 attached to the end of the piston 93B moves to the standby position on the Z-axis. As the head holder 70 moves to the standby position on the Z-axis, the controller 500 instructs the cleaning unit 4 to start cleaning the head 300. Then, the cleaning unit 4 cleans the head 300 (step S15).

As the head 300 has been cleaned, the controller 500 turns off the air solenoid valve 93D of the second Z-direction driver 93 (step S16). As a result, the piston 93B of the air cylinder of the second Z-direction driver 93 moves in the direction in which the piston 93B is pushed out relative to the cylinder body 93A. As the piston 93B moves, the head holder 70 attached to the end of the piston 93B moves to the ink discharge position on the Z-axis at which ink can discharged.

As the head holder 70 reaches the ink discharge position, the controller 500 decreases the excitation current of the drive motor of the first Z-direction driver 92 to the previous excitation current of the drive motor when the head 300 stops discharging ink (step S17). Then, the liquid discharge apparatus 1000 starts the ink discharge based on an instruction from the controller 500 (step S18).

As described above, in the present embodiment, the controller 500 controls the excitation current of the first Z-direction driver 92 based on the collision detection signal from the collision detection plate 7L or 7R that detects the collision of the carriage 1. In addition, the controller 500 controls the excitation current of the first Z-direction driver 92 based on the instruction to clean the head 300 of the carriage 1.

Thus, when an abnormality such as a collision of the carriage 1 is detected or when the head 300 is cleaned, the head 300 moves, thereby generating the impact. However, the impact generated due to the movement of the head 300 is hardly transmitted to the carriage 1, thereby preventing the loss of synchronization of the carriage 1.

Figure 9:
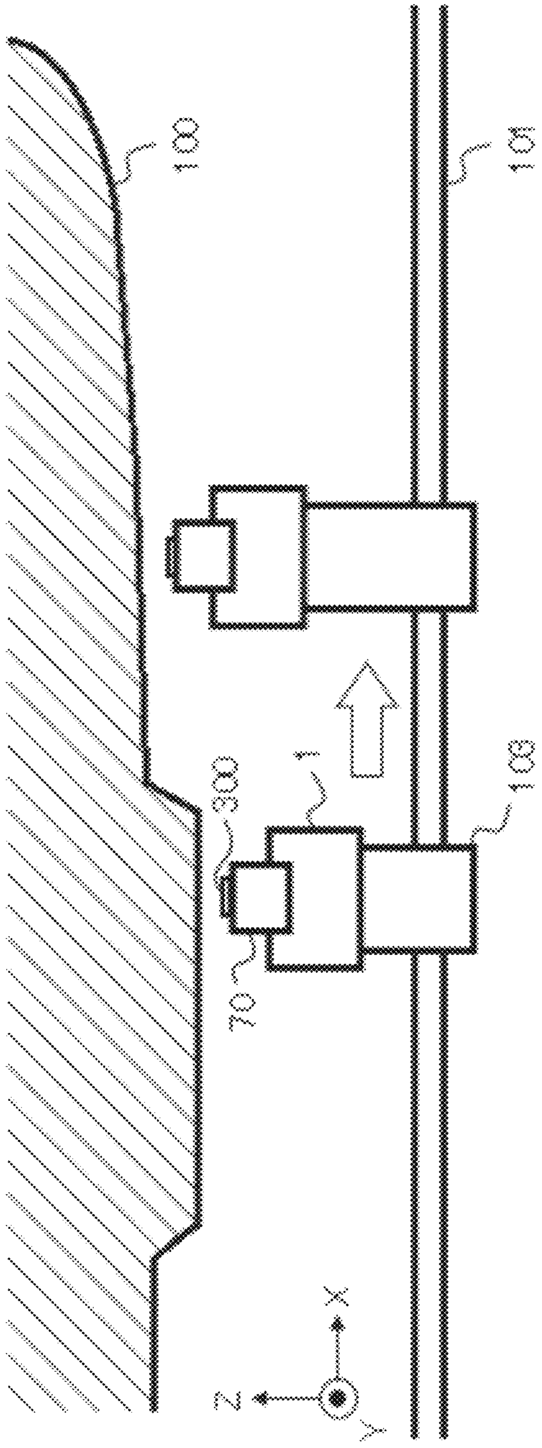
FIG. 9 is a schematic view illustrating an example of movement of a head mounted on the head holder relative to an object.

FIG. 9 is a schematic view illustrating an example of movement of the head 300 relative to the object 100. To keep the gap between the head 300 and the object 100 constant during the ink discharge to the object 100, the liquid discharge apparatus 1000 according to the present embodiment measures the surface shape of the object 100 before the ink discharge (i.e., the position measurement). Then, the liquid discharge apparatus 1000 creates three dimensional coordinate data (body data) indicating the surface shape of the object 100.

The liquid discharge apparatus 1000 moves the carriage 1 in the positive X-axis direction as illustrated in FIG. 9 or in the negative X-axis direction during the ink discharge based on the body data created in advance. In addition, while moving the carriage 1 in the positive and negative X-axis directions, the liquid discharge apparatus 1000 moves the head 300 along the Z-axis so as to follow the surface shape of the object 100 and causes the head 300 to discharge ink.

Figures 10A, 10B:
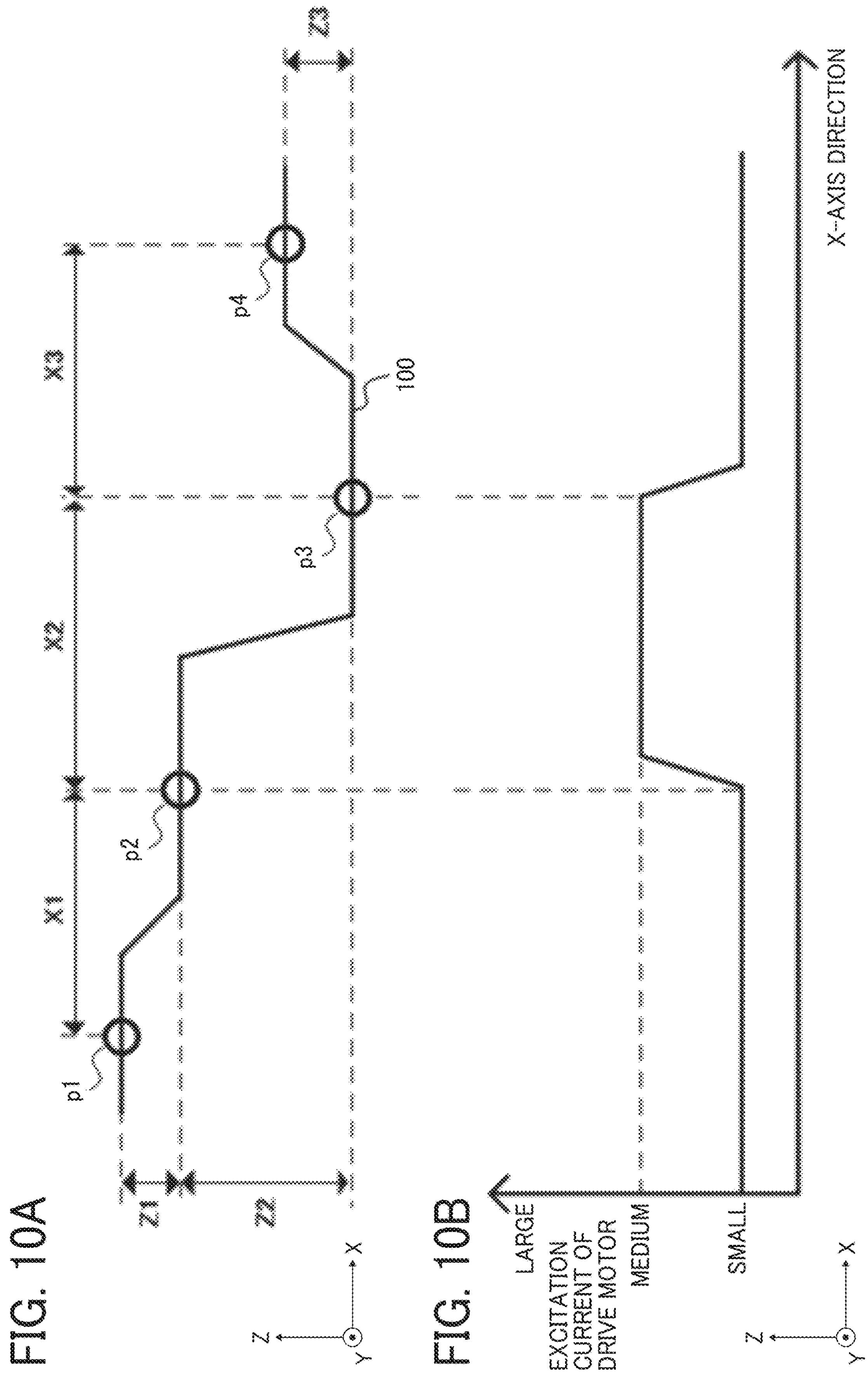
FIGS. 10A and 10B are graphs illustrating the control of an excitation current of a drive motor of the first Z-direction driver in a region in which the head is likely to collide with the object.

In the liquid discharge apparatus 1000 described above, the controller 500 may calculates a region in which an abnormality such as a collision is likely to occur during the ink discharge based on the body data, and may control the excitation current of the drive motor in the region. FIGS. 10A and 10B are graphs illustrating the control of the excitation current of the drive motor in the region in which the head 300 is likely to collide with the object 100.

Measurement points p1, p2, p3, and p4 marked with circles in FIG. 10A are examples. The surface shape of the object 100 is measured at the measurement points p1 to p4 before the ink discharge and three dimensional coordinate data (body data) indicating the surface shape of the object 100 is created. The measurement points p1 to p4 are located at distances X1, X2, and X3 along the X-axis and at distances Z1, Z2, and Z3 along the Z-axis as illustrated in FIG. 10A, respectively. The region in which the head 300 is likely to collide with the object 100 can be derived from the following two Expressions 1 and 2.

$$Zth<Zn \qquad \text{Expression 1}$$

$$(Zth/Xth)<(Zn/Xn) \qquad \text{Expression 2}$$

Here, Xth and Zth represent certain thresholds, Xn (n=1, 2, 3) represents the distance between the measurement points along the X-axis, and Zn (n=1, 2, 3) represents the distance between the measurement points along the Z-axis.

In the example illustrated in FIG. 10A, the head 300 may collide with the object 100 while the carriage 1 moves from the measurement point p2 to the measurement point p3. In this case, the controller 500 causes the excitation current of the drive motor of the first Z-direction driver 92 to increase from a small value (for example, about 20% of the maximum value) to a medium value (for example, about 50% of the maximum value) in the region corresponding to the distance X2.

Since the excitation current increases from the small value to the medium value as described above, if a collision actually occurs during the ink discharge, the controller 500 can immediately increase the excitation current of the drive motor of the first Z-direction driver 92 to a large value (for example, the maximum value). Therefore, when the collision occurs during the ink discharge, the excitation current of the drive motor of the first Z-direction driver 92 immediately reaches the maximum value, and the second Z-direction driver 93 can be quickly driven. Thus, the risk of collision between the head 300 and the object 100 can be reduced.

As described above, the controller 500 calculates the region in which the head 300 is likely to collide with the object 100 during the ink discharge based on the three dimensional coordinate data (body data) indicating the shape of the object 100, and increases the excitation current of the first Z-direction driver 92 in the region. Therefore, when the collision occurs during the ink discharge, the second Z-direction driver 93 can be quickly driven, and the risk of collision between the head 300 and the object 100 can be reduced.

Figures 11A, 11B, 11C:
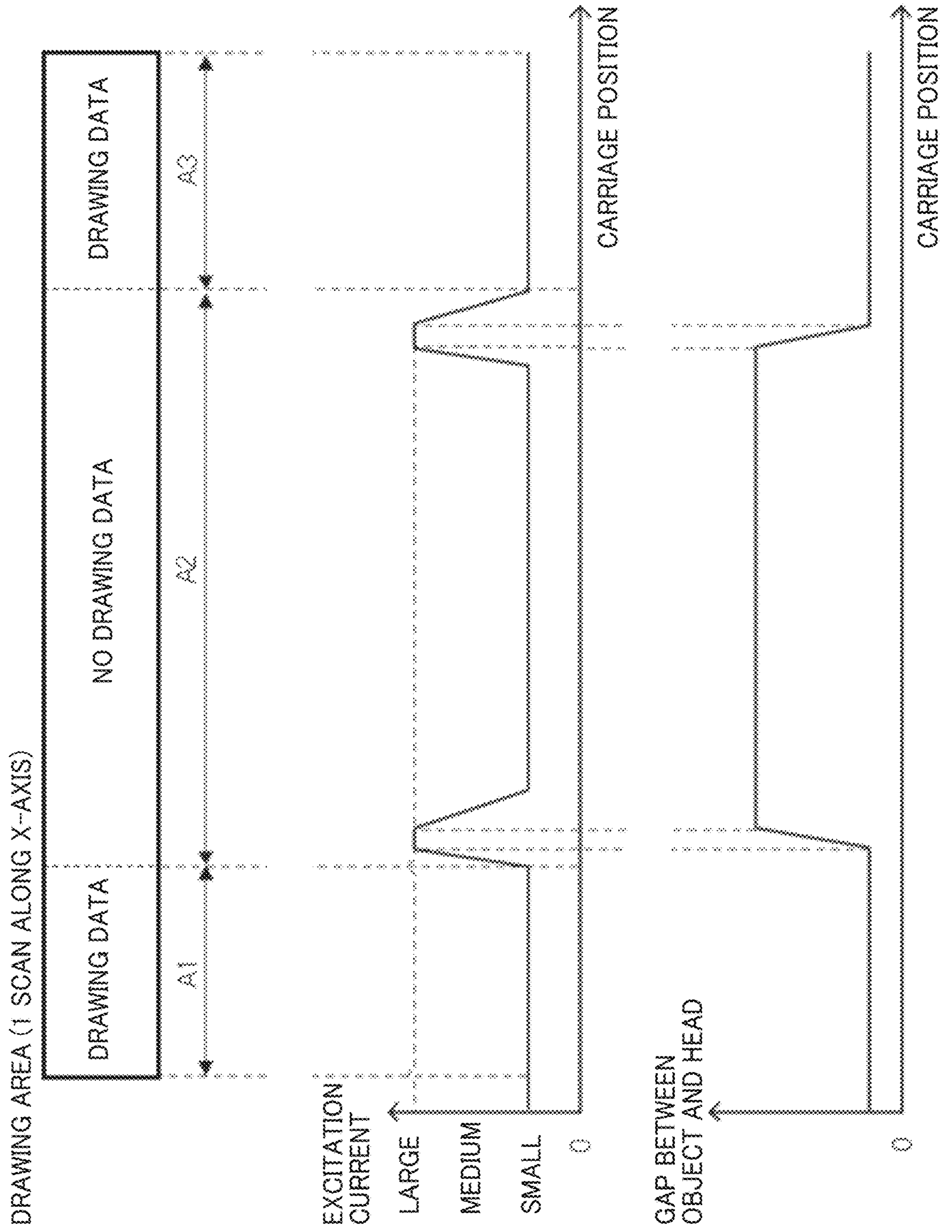
FIGS. 11A to 11C are graphs illustrating the control of the excitation current of the drive motor based on the percentage of drawing data.

In FIGS. 10A and 10B, the excitation current is controlled based on the body data to reduce the risk of collision, but may be controlled based on the drawing data to reduce the risk of collision. For example, as described below, the controller 500 may calculate a percentage of the drawing data based on the drawing data used in the ink discharge to the object 100 and may control the excitation current of the drive motor based on the percentage. FIGS. 11A to 11C are graphs illustrating the control of the excitation current of the drive motor based on the percentage of the drawing data.

For example, when the carriage 1 move in the positive X-axis direction in the drawing area (i.e., one scan of the carriage 1), a region with no drawing data is continuously present in 30% or more of the drawing area in the drawing data. In this case, the gap between the object 100 and the head 300 is increased to reliably reduce the risk of collision of the head 300 with a collision object such as a protrusion.

In FIG. 11A, there is no drawing data in a section A2. In this case, the head holder 70 moves back in the negative Z-axis direction relative to the carriage 1 when the carriage 1 moves from a section A1 to the section A2, and the head holder 70 moves forward in the positive X-axis direction relative to the carriage 1 when the carriage 1 moves from the section A2 to a section A3 as illustrated in FIG. 11C.

When the head holder 70 moves forward and back, the power cylinder of the second Z-direction driver 93 is operated. Therefore, the controller 500 increases the excitation current of the drive motor of the first Z-direction driver 92 from the small value to the large value as illustrated in FIG. 11B before the power cylinder is operated.

As described above, when the carriage 1 moves from the section A1 to the section A2, the controller 500 maximizes the excitation current of the drive motor of the first Z-direction driver 92, thereby increasing the holding force for retaining the stop position of the drive motor. Then the controller 500 drives the second Z-direction driver 93. The second Z-direction driver 93 retracts the head holder 70 from the object 100 to increase the gap between the object 100 and the head 300, and then the controller 500 returns the excitation current of the drive motor to the small value. As a result, the gap between the object 100 and the head 300 is widened in the region with no drawing data, thereby reducing the risk of collision.

Further, when the carriage 1 moves from the section A2 to the section A3, the controller 500 maximizes the excitation current of the drive motor of the first Z-direction driver 92, thereby increasing the holding force for retaining the stop position of the drive motor. Then the controller 500 drives the second Z-direction driver 93. The second Z-direction driver 93 moves the head holder 70 toward the object 100 to decrease the gap between the object 100 and the head 300, and then the controller 500 returns the excitation current of the drive motor to the small value.

As described above, the controller 500 calculates the percentages of the region with the drawing data where drawing is to be performed and the region with no drawing data where no drawing is to be performed based on the drawing data used in the ink discharge to the object 100 and increases the excitation current of the first Z-direction driver 92 based on the percentages. As a result, the gap between the object 100 and the head 300 is widened in the region with no drawing data, thereby reducing the risk of collision.

Figure 12:
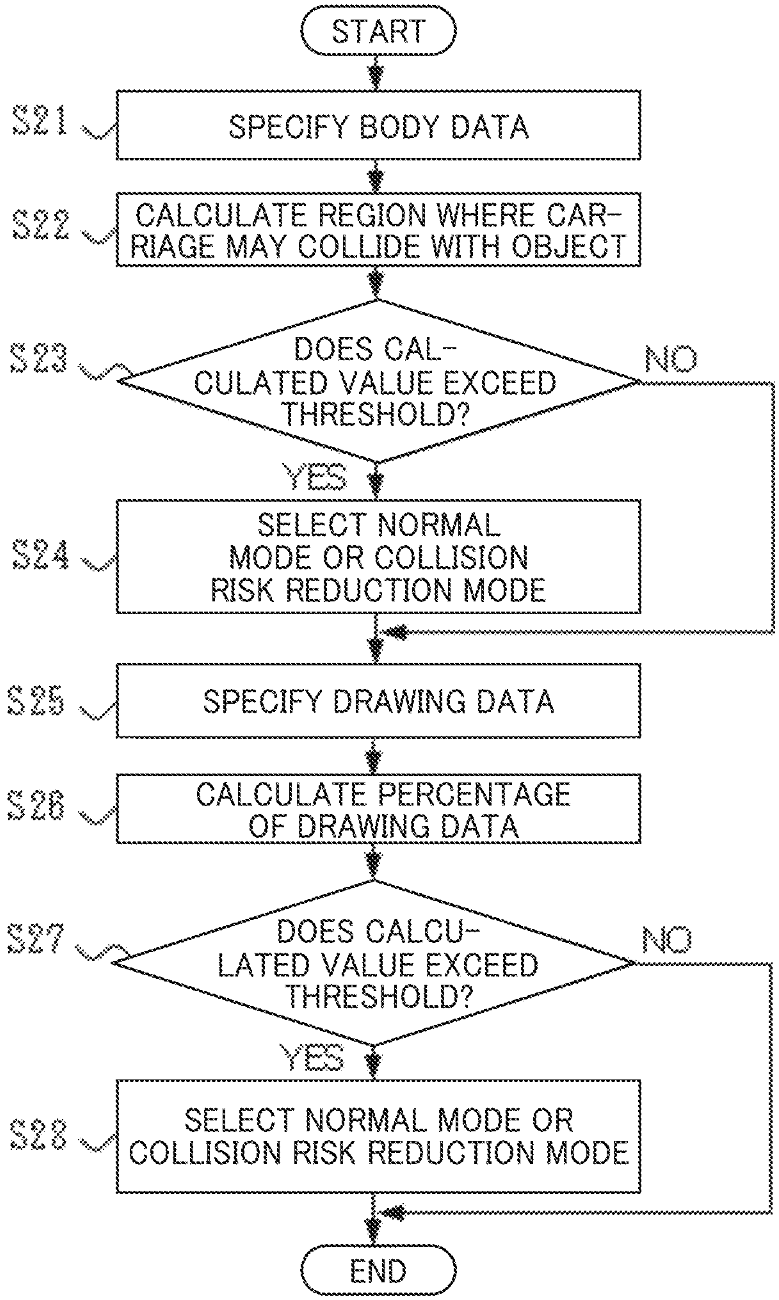
FIG. 12 is a flowchart of a collision risk reduction mode according to an embodiment of the present disclosure.

FIG. 12 is a flowchart of a collision risk reduction mode. The two controls described with reference to FIGS. 10A and 10B, and FIGS. 11A to 11C may be combined into a series of flows as a collision risk reduction mode illustrated in FIG. 12.

In this flow, first, the controller 500 specifies three dimensional coordinate data (body data) regarding the surface shape of the object 100 (step S21). The controller 500 calculates a region in which the head 300 is likely to collide with the object 100 based on the body data (step S22). Next, the controller 500 determines whether or not any of the calculated values exceeds the threshold (step S23). If there is no value exceeding the threshold, the process proceeds to step S25. On the other hand, if there is a value exceeding the threshold, the controller 500 selectively determines an execution of a control of the excitation current between the normal mode and the collision risk reduction mode (step S24).

The controller 500 specifies drawing data to be drawn on the object 100 (step S25). As the drawing date is specified, the controller 500 calculates the percentage of the drawing data based on the drawing data (step S26). Next, the controller 500 determines whether or not any of the calculated values exceeds the threshold (step S27). If there is no value exceeding the threshold, the process ends. On the other hand, if there is a value exceeding the threshold, the controller 500 selectively determines an execution of a control of the excitation current between the normal mode and the collision risk reduction mode (step S28). After the mode is determined, the process ends. According to this flow, a user can select the collision risk reduction mode on a user interface (UI) such as the control panel 503 as appropriate.

As described above, in the present embodiment, the controller 500 can selectively determine executions of a control of the excitation current of the first Z-direction driver 92 in the region in which a collision (abnormality) is likely to occur and a control of the excitation current of the first Z-direction driver 92 based on the percentage of the drawing data. Thus, a user can select the normal mode or the risk reduction mode.

Figure 13:
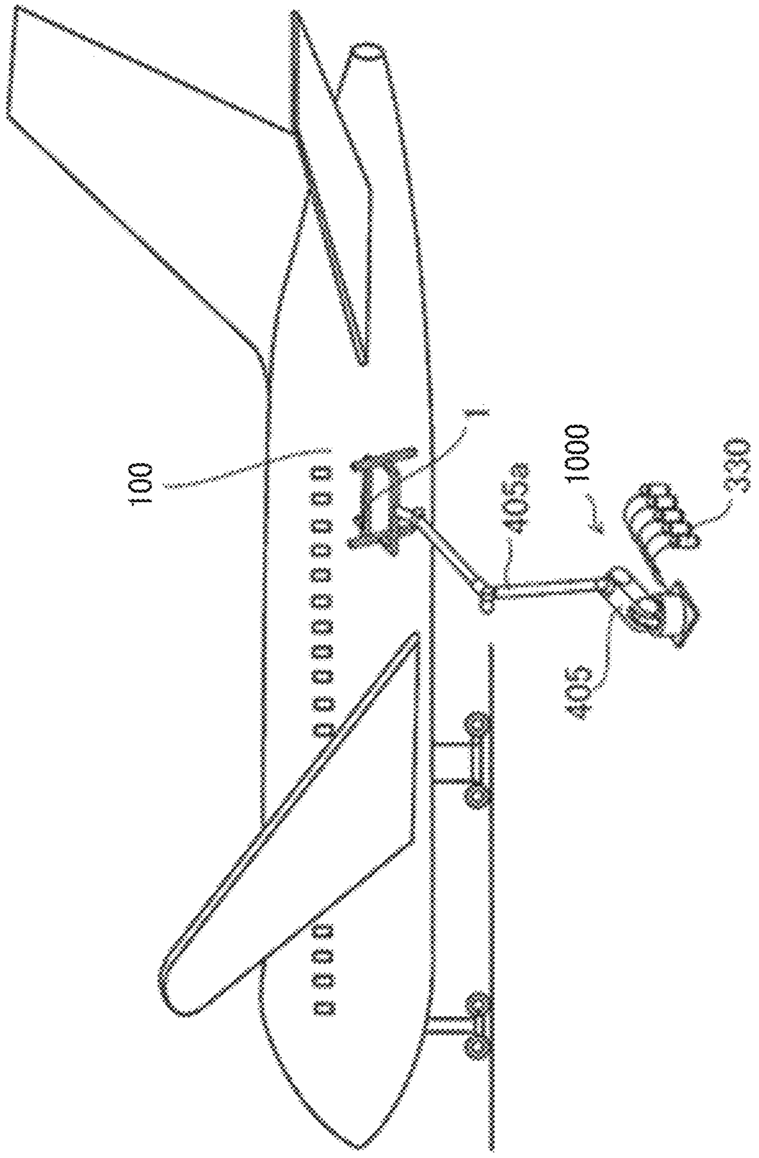
FIG. 13 is a schematic view of a liquid discharge apparatus according to a first variation of the present disclosure.
Figure 14:
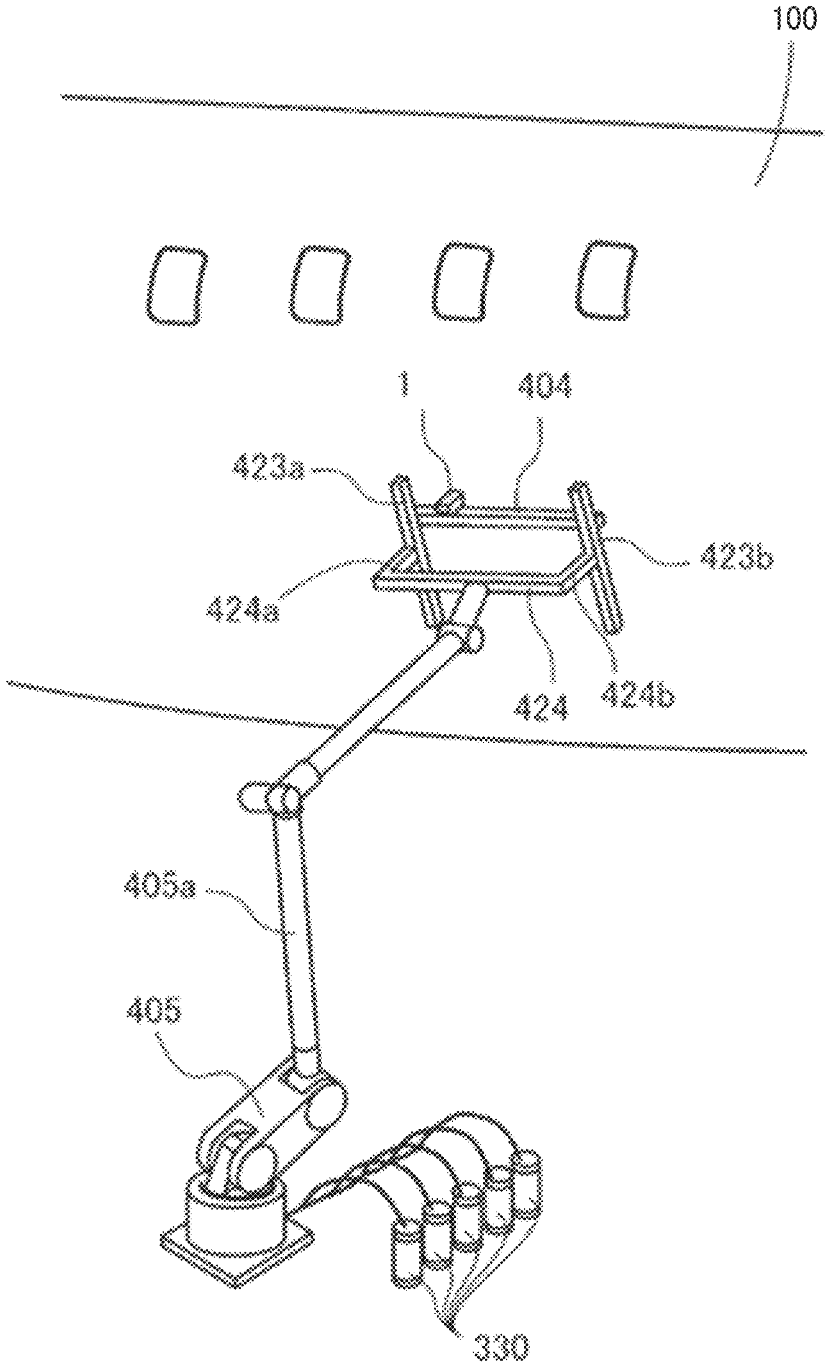
FIG. 14 is an enlarged perspective view of the liquid discharge apparatus according to the first variation.

FIG. 13 is a schematic view of a liquid discharge apparatus 1000 according to a first variation of the present disclosure. FIG. 14 is an enlarged perspective view of the liquid discharge apparatus 1000 according to the first variation. The liquid discharge apparatus 1000 includes a linear rail 404 and a multi-articulated robot 405. The linear rail 404 movably supports the carriage 1 that reciprocally and linearly moves along the linear rail 404. The multi-articulated robot 405 appropriately moves the linear rail 404 to a predetermined position and holds the linear rail 404 at the predetermined position. The multi-articulated robot 405 includes a robot arm 405*a* that is freely movable like a human arm by a plurality of joints. The multi-articulated robot 405 can freely move a distal end of the robot arm 405*a* and arrange the distal end of the robot arm 405*a* at an accurate position.

An industrial robot of a six-axis control-type having six axes (six joints) can be used as the multi-articulated robot 405, for example. According to the multi-articulated robot 405 of the six-axis control-type, it is possible to previously teach data related to a movement of the multi-articulated robot 405. As a result, the multi-articulated robot 405 can accurately and quickly position the linear rail 404 at a predetermined position facing an object 100 (an aircraft in the present embodiment). The multi-articulated robot 405 is not limited to the six-axis control-type. The multi-articulated robot having an appropriate number of axes such as five axes, seven axes, or the like can be used.

The robot arm 405*a* of the multi-articulated robot 405 includes a fork-shaped support 424 bifurcated into two. A vertical linear rail 423*a* is attached to a tip of a left branch 424*a* of the support 424, and a vertical linear rail 423*b* is attached to a tip of a right branch 424*b* of the support 424. The vertical linear rail 423*a* and the vertical linear rail 423*b* are parallel to each other. Further, both ends of the linear rail 404 that movably supports the carriage 1 are supported by the vertical linear rails 423*a* and 423*b*.

The carriage 1 includes the head 300 described above, and supplies ink from an ink tank 330 to the head 300. In the liquid discharge apparatus 1000, the multi-articulated robot 405 moves the linear rail 404 to a desired drawing area of the object 100, and the heads 300 are driven to draw images on the object 100 while moving the carriage 1 along the linear rail 404 according to drawing data.

As the liquid discharge apparatus 1000 ends drawing of one line, the liquid discharge apparatus 1000 causes the vertical linear rails 423*a* and 423*b* of the multi-articulated robot 405 to move the heads 300 of the carriage 1 to the next line. The liquid discharge apparatus 1000 repeats the above-described operation to draw images on the desired drawing area of the object 100.

When the liquid discharge apparatus 1000 draws images, for example, on the body of the aircraft, the carriage 1 may move several tens of meters. However, since the carriage 1 includes the cleaning unit 4, the head 300 can be cleaned as appropriate. Accordingly, the liquid discharge apparatus 1000 can continuously draw high quality images with small downtime.

Figure 15:
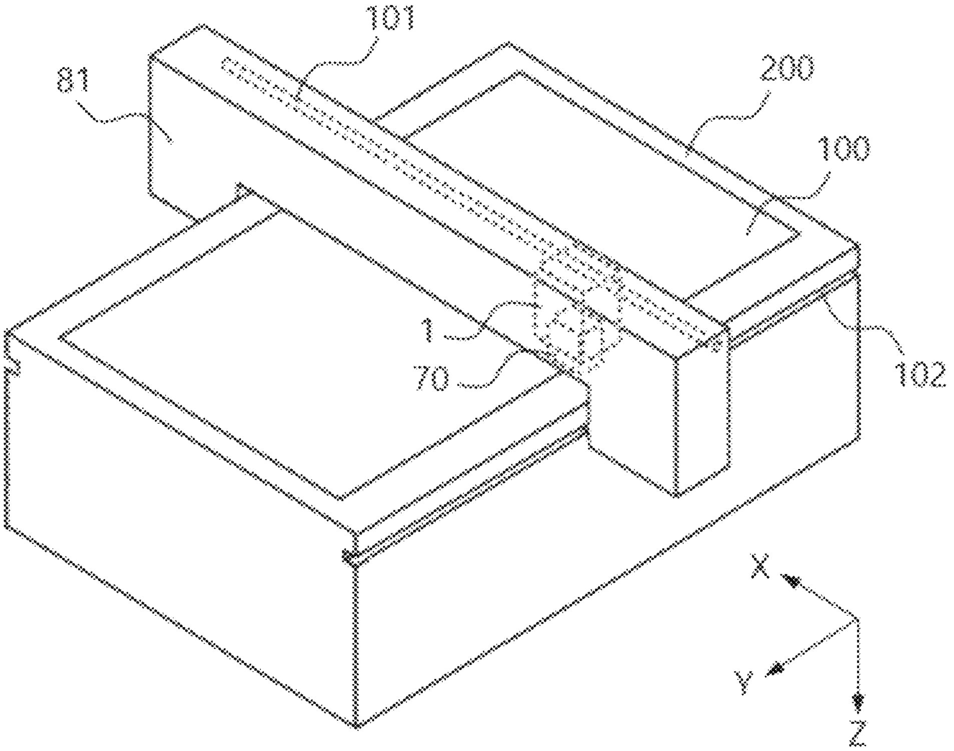
FIG. 15 is a schematic perspective view of a liquid discharge apparatus according to a second variation of the present disclosure.

FIG. 15 is a schematic perspective view of a liquid discharge apparatus according to a second variation of the present disclosure. In the liquid discharge apparatus according to the second variation, the carriage 1 including the head holder 70 moves along the X-axis and the Y-axis relative to the object 100 to draw images on the object 100. The object 100, such as paper, film, wood plate, or the like is positioned on a horizontal table 200. The carriage 1 moves along the X-axis along the X-axis rail 101. In addition, as a frame 81 supporting the X-axis rail 101 moves along the Y-axis rail 102 disposed on the side surface of the table 200, the carriage 1 moves along the Y-axis.

Similarly to the other embodiments described above, the head holder 70 includes the head 300 and moves along the Z-axis relative to the carriage 1, thereby moving the nozzle face 302*a* of the head 300 along the Z-axis. The liquid discharge apparatus according to the second variation is different from the above-described embodiments in that liquid is discharged downward in the direction of gravity to the object 100 horizontally placed on the table 200. The present disclosure is applicable to such a liquid discharge apparatus.

Figure 16:
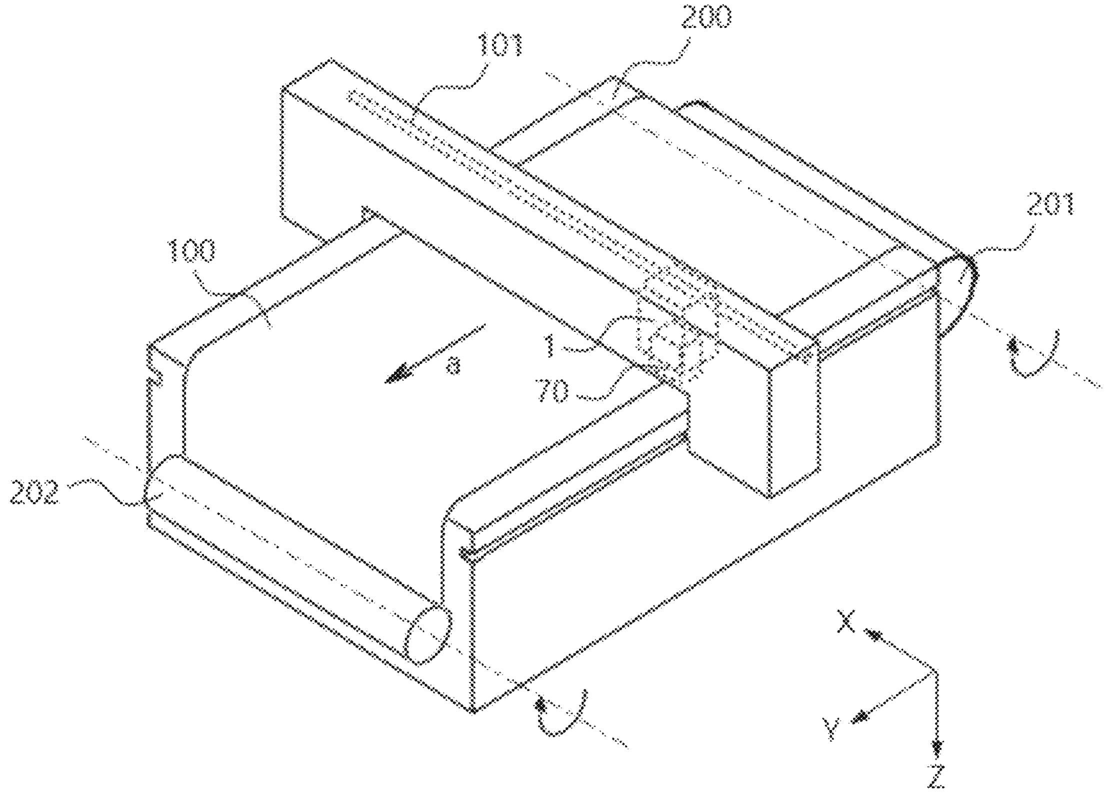
FIG. 16 is a schematic perspective view of a liquid discharge apparatus according to a third variation of the present disclosure.
Figure 17:
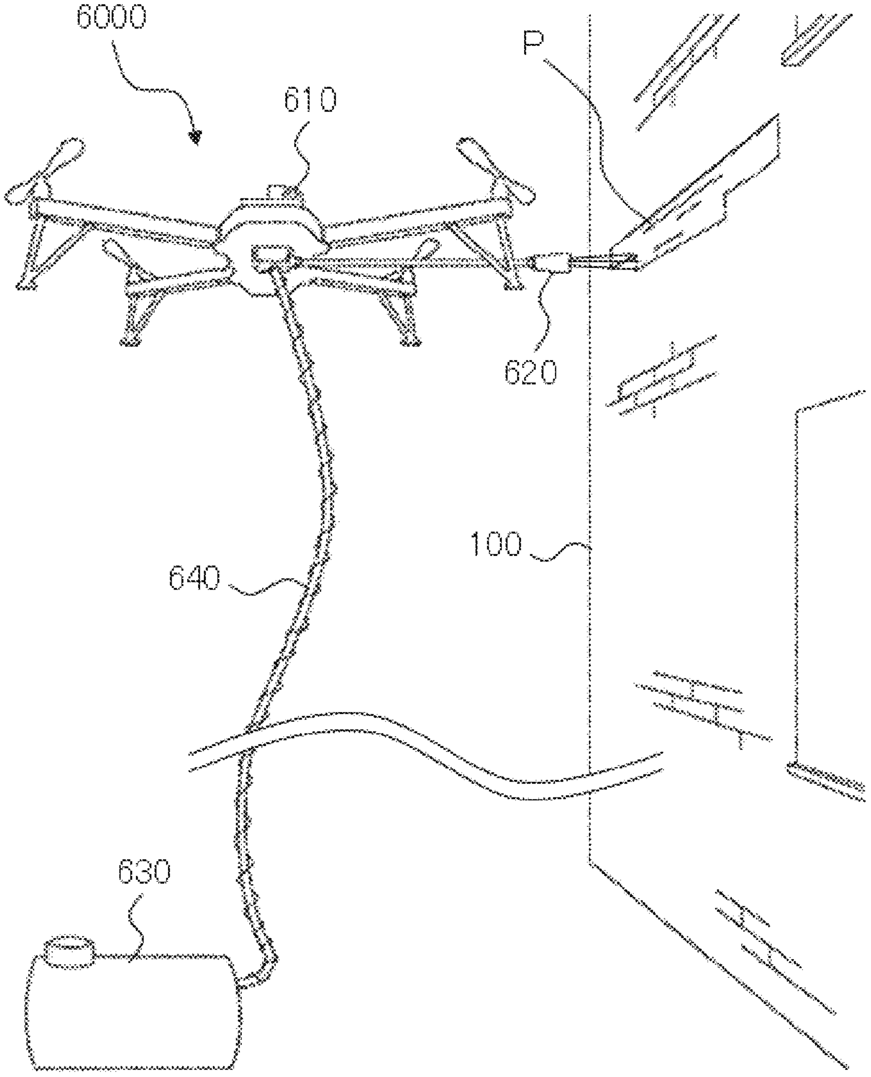
FIG. 17 is a schematic view illustrating an example of an apparatus to which the present disclosure is applied.

FIG. 16 is a schematic perspective view of a liquid discharge apparatus according to a third variation of the present disclosure. The liquid discharge apparatus according to the third variation is different from the liquid discharge apparatus according to the second variation in that the object 100 moves on the table 200 in the direction indicated by arrow a. In the liquid discharge apparatus according to the third variation, the carriage 1 including the head holder 70 moves along the X-axis to draw images on the object 100. The object 100 is fed from an object feeder 201. As the carriage 1 ends drawing of one line, the object 100 moves a predetermined length in the direction indicated by arrow a, and stops. The carriage 1 moves along the X-axis relative to the object 100 not in motion to draw the next line. Thus, the carriage 1 draws each line while the object 100 intermittently moves and repeats such an operation to draw images on the object 100.

Similarly to the liquid discharge apparatus according to the second variation, the carriage 1 moves along the X-axis along the X-axis rail 101. The liquid discharge apparatus according to the third variation is different from the liquid discharge apparatus according to the second variation in which the carriage 1 also moves along the Y-axis. In the third variation, since the object 100 moves on the table 200, the carriage 1 is not required to move along the Y-axis while drawing on the object 100, and is secured (stopped) at a predetermined position. The object 100 that has passed under the carriage 1 is wound by an object winder 202 provided in the liquid discharge apparatus. Similarly to the other embodiments described above, the head holder 70 includes the head 300 and moves along the Z-axis relative to the carriage 1, thereby moving the nozzle face 302*a* of the head 300 along the Z-axis.

The liquid discharge apparatus according to the third variation is different from the above-described embodiments in that the carriage 1 moves only along the X-axis and the Z-axis and does not move along the Y-axis. The present disclosure is applicable to such a liquid discharge apparatus. The carriage 1 is not limited to a configuration in which the carriage 1 moves in three directions along the X-axis, the Y-axis, and the Z-axis and a configuration in which the carriage 1 moves in two directions along one of the X-axis and the Y-axis, and the Z-axis. For example, when the object 100 moves in two directions along the X-axis and the Y-axis, the carriage 1 may be secured on the X-axis and the Y-axis.

In the present disclosure, examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. These liquids can be used for, e.g., inkjet ink, surface treatment solution, a liquid for forming components of electronic element or light-emitting element or a resist pattern of electronic circuit, or a material solution for three-dimensional fabrication.

Next, other examples to which the present disclosure is applied are described with reference to FIGS. 17 to 22. The present disclosure can also be applied to an unmanned aerial vehicle 6000 such as a drone illustrated in FIG. 17. The unmanned aerial vehicle 6000 includes a detector 610 such as a rangefinder mounted thereon and controls the position of the unmanned aerial vehicle 6000 based on a detection result of the detector 610. The unmanned aerial vehicle 6000 further includes a liquid discharge unit 620 including a head that discharges liquid such as ink. Liquid stored in a liquid tank 630 is supplied to the liquid discharge unit 620 via a tube 640. The unmanned aerial vehicle 6000 causes the head of the liquid discharge unit 620 to discharge the liquid toward an object 100 (a wall of a building in the present embodiment) based on the position controlled as described above to applies the liquid to an area to be painted P of the object 100.

Figure 18:
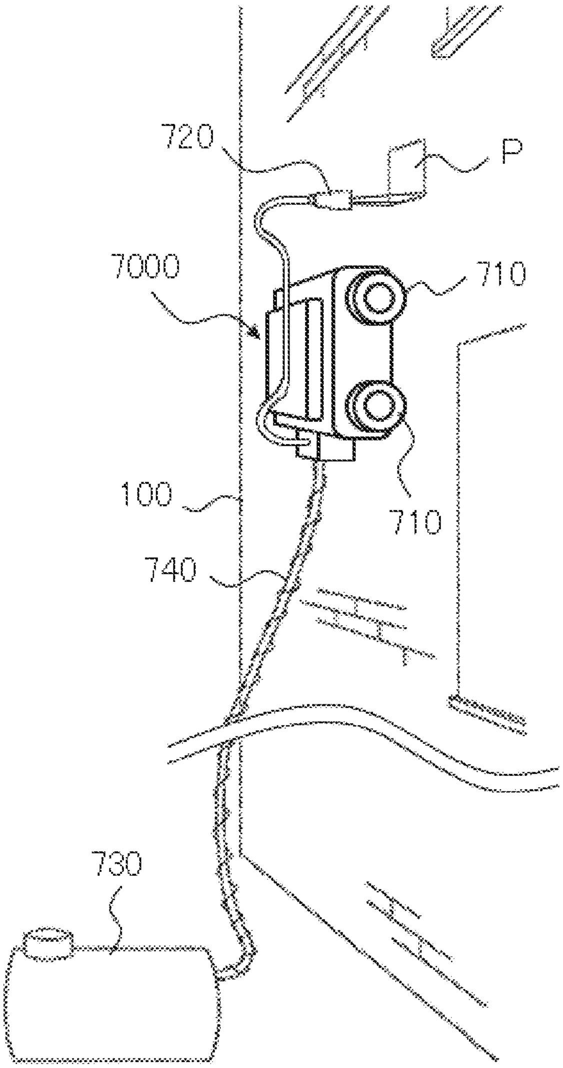
FIG. 18 is a schematic view illustrating another example of an apparatus to which the present disclosure is applied.

The present disclosure can also be applied to an unmanned vehicle 7000 such as a wall climbing robot illustrated in FIG. 18. The unmanned vehicle 7000 drives rollers 710 while sucking the object 100 (the wall of the building in the present embodiment) at the bottom of the unmanned vehicle 7000 to move on the object 100. The unmanned vehicle 7000 includes a liquid discharge unit 720 including a head that discharges liquid such as ink. Liquid stored in a liquid tank 730 is supplied to the liquid discharge unit 720 via a tube 740. The unmanned vehicle 7000 causes the head of the liquid discharge unit 720 to discharge the liquid toward the object 100 (the wall of the building in the present embodiment) to applies the liquid to an area to be painted P of the object 100.

Figure 19:
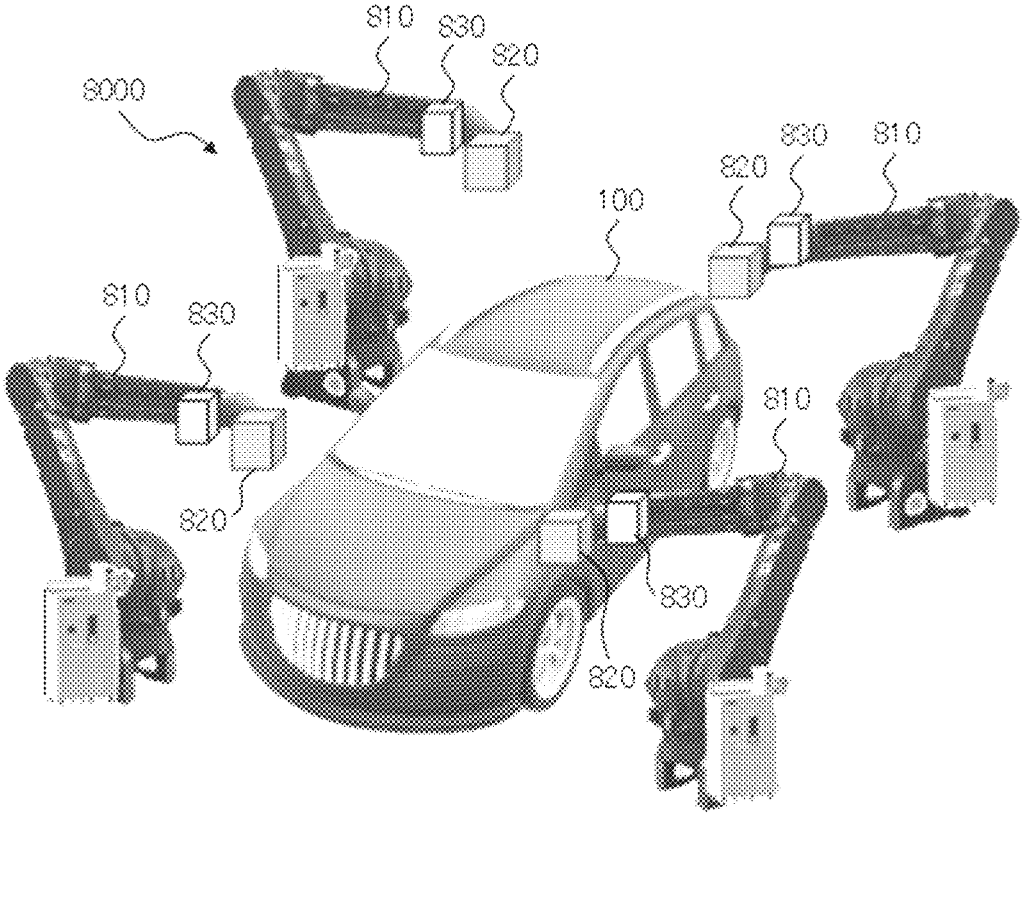
FIG. 19 is a schematic view illustrating still another example of an apparatus to which the present disclosure is applied.

The present disclosure can also be applied to a coating robot 8000 illustrated in FIG. 19 that coats, for example, a body of an automobile. The coating robot 8000 includes a robot arm 810 that is freely movable like a human arm by a plurality of joints, and further includes a liquid discharge unit 820 including a head that discharges liquid at a distal end of the robot arm 810. The robot arm 810 includes a three-dimensional (3D) sensor 830 near of the liquid discharge unit 820. The coating robot 8000 having an appropriate number of axes such as five, six, or seven axes can be used. The coating robot 8000 detects the position of the liquid discharge unit 820 relative to the object 100 (the body of the automobile in the present embodiment) by the 3D sensor 830, and moves the robot arm 810 based on the detection result to coat the object 100.

Figure 20:
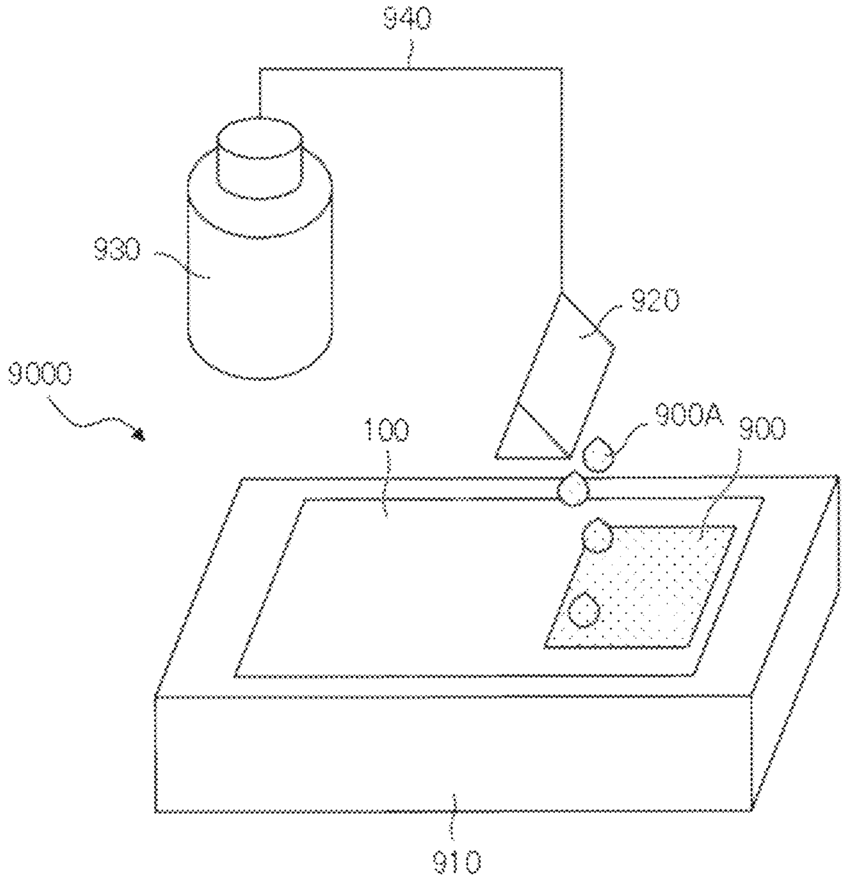
FIG. 20 is a schematic view illustrating yet another example of an apparatus to which the present disclosure is applied.

The present disclosure can also be applied to an apparatus 9000 illustrated in FIG. 20 that discharges liquid to manufacture an electrode, for example. FIG. 20 is a schematic view of the apparatus 9000 that manufactures a negative electrode used for an electrochemical element such as a primary battery, a secondary battery, or a capacitor. This apparatus 9000 includes a liquid discharge unit 920 including a head that discharges liquid. The liquid is discharged to an object 100 (a negative electrode substrate in the present embodiment) on a stage 910 by an inkjet method. A liquid tank 930 stores a liquid composition 900A for forming a negative electrode composite layer 900, and the liquid composition 900A is supplied from the liquid tank 930 to the liquid discharge unit 920 via a tube 940.

Figure 21:
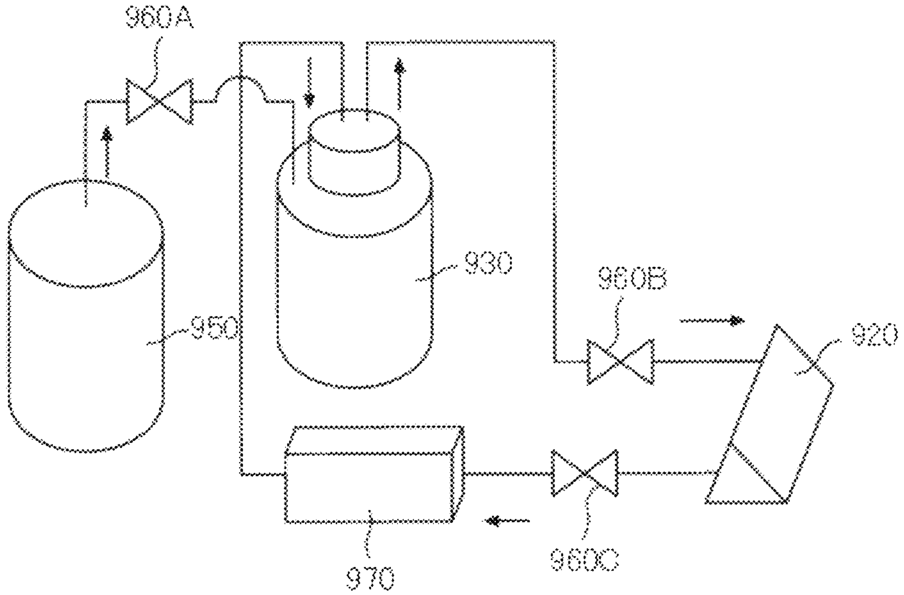
FIG. 21 is a schematic view illustrating a variation of the apparatus in FIG. 20.

As illustrated in FIG. 21, the liquid composition 900A may be circulated in the apparatus 9000. In FIG. 21, an external tank 950 is connected to the liquid tank 930 via a valve 960A, and the liquid tank 930 is connected to the liquid discharge unit 920 via a valve 960B. Further, the liquid discharge unit 920 is connected to a pump 970 via a valve 960C, and the pump 970 is connected to the liquid tank 930. In the above-described configuration, the apparatus 9000 controls the flow of the liquid composition 900A with the pump 970 and the valves 960B and 960C to circulate the liquid composition 900A, which is stored in the liquid tank 930, in the apparatus 9000.

As described above, the apparatus 9000 includes the external tank 950 and the valve 960A. The apparatus 9000 controls the valve 960A to supply the liquid composition 900A from the external tank 950 to the liquid tank 930 of the apparatus 9000 when the liquid composition 900A to be discharged decreases. As illustrated in FIG. 20, the object 100 (the negative electrode substrate) is placed on the stage 910 that is heatable, and the liquid composition 900A is discharged onto the object 100. At this time, the stage 910 may be moved relative to the liquid discharge unit 920, or the liquid discharge unit 920 may be moved relative to the object 100. The stage 910 heats and dries the liquid composition 900A on the object 100, thereby forming the negative electrode composite layer 900.

Note that drying is not limited to heating on the stage 910. For example, a drying device provided separately from the stage 910 may be used. The drying device is not particularly limited and may be appropriately selected as long as the drying device does not directly contact the liquid composition 900A. For example, a resistance heater, an infrared heater, a fan heater, or a blower can be used as the drying device. A plurality of drying devices may be provided.

Figure 22:
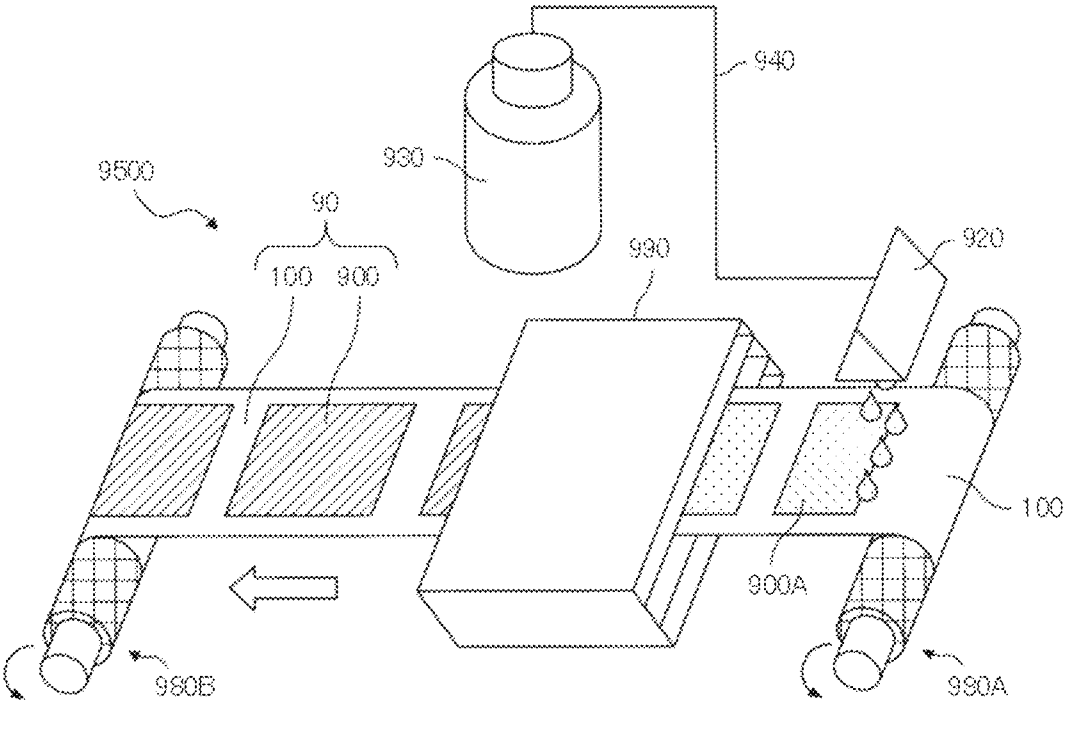
FIG. 22 is a schematic view illustrating still yet another example of an apparatus to which the present disclosure is applied.

The negative electrode used for the electrochemical element can also be manufactured using an apparatus 9500 illustrated in FIG. 22. In the apparatus 9500, a band-shaped object 100 (the negative electrode substrate in the present embodiment) made of stainless steel, copper or the like is wound around a cylindrical core, and the object 100 is loaded on a feed roller 980A and a winding roller 980B such that the surface of the object 100 on which the negative electrode composite layer 900 is to be formed faces upward. As the feed roller 980A and the winding roller 980B rotate counterclockwise, the object 100 moves from right to left in FIG. 22. The liquid tank 930 stores the liquid composition 900A for forming the negative electrode composite layer 900, and the liquid composition 900A is supplied from the liquid tank 930 to the liquid discharge unit 920 via the tube 940. The liquid discharge unit 920 is disposed above the object 100 between the feed roller 980A and the winding roller 980B. A plurality of liquid discharge units 920 may be provided in a direction substantially parallel or substantially perpendicular to the conveyance direction of the object 100.

The feed roller 980A and the winding roller 980B convey the object 100 carrying the liquid composition 900A to a drying device 990. As a result, the liquid composition 900A on the object 100 is dried to form the negative electrode composite layer 900, thereby forming a negative electrode 90 in which the negative electrode composite layer 900 is bonded onto the object 100 as the negative electrode substrate. Thereafter, the negative electrode 90 is cut into a desired size by punching or the like. The drying device 990 is not particularly limited and may be appropriately selected as long as the drying device 990 does not directly contact the liquid composition 900A. For example, a resistance heater, an infrared heater, or a fan heater can be used as the drying device 990. Note that the drying device 990 may be provided above or below the object 100. A plurality of drying devices 990 may be provided.

In the apparatuses 9000 and 9500 that manufacture the negative electrode used for the electrochemical element as described above, an inkjet method is preferable in that a liquid can be applied to an aimed portion of the object 100 below the liquid discharge unit 920. In addition, the inkjet method is preferable because the surfaces of the object 100 (the negative electrode substrate) and the negative electrode composite layer 900, which are in contact with each other, can be bonded to each other. Further, the inkjet method is preferable because the negative electrode composite layer 900 can have even film thickness.

In the above description, the apparatus that manufactures the negative electrode used for the electrochemical element has been described as an example, but the present disclosure can also be applied to an apparatus that manufactures a positive electrode. When the positive electrode is manufactured, a positive electrode substrate is used as the object 100 instead of the negative electrode substrate, and a liquid composition for forming a positive electrode composite layer is used instead of the liquid composition 900A for forming the negative electrode composite layer 900.

The above-described embodiments are examples and, for example, the following aspects 1 to 6 of the present disclosure can provide the following advantages.

Aspect 1

According to Aspect 1, the liquid discharge apparatus 1000 (an example of a liquid discharge apparatus) includes the head 300 (an example of a liquid discharge portion) having the nozzle 302 (an example of a liquid discharge port) and the carriage 1 (an example of a liquid discharge unit). The head 300 performs a liquid discharge to discharge a liquid along the Z-axis (an example of a liquid discharge direction) from the nozzle 302 toward the object 100 (an example of an object). The carriage 1 holds the head 300 and is movable along the Z-axis. The liquid discharge apparatus 1000 further includes the first Z-direction driver 92 (an example of a first driver) to move the carriage 1 along the Z-axis, the second Z-direction driver 93 (an example of a second driver) to move the head 300 relative to the carriage 1 along the Z-axis, the collision detection plates 7L and 7R (an example of an abnormality detector) to detect an abnormality of the liquid discharge unit, and the controller 500 (an example of circuitry). The controller 500 increases an excitation current of the first Z-direction driver 92 in response to an abnormality detection signal from the collision detection plate 7L or 7R, or an instruction to clean the head 300 and drive the second Z-direction driver 93 after increasing the excitation current.

According to Aspect 1, the liquid discharge apparatus 1000 can be provided that reduces power consumption in operation.

Aspect 2

According to Aspect 2, in Aspect 1, the controller 500 calculates the region in which an abnormality is to occur during the ink discharge to the object 100 based on the three dimensional coordinate data (an example of coordinate data) indicating the shape of the object 100, and increase the excitation current of the first Z-direction driver 92 in the region.

According to Aspect 2, when the abnormality occurs during the ink discharge, the second Z-direction driver 93 can be quickly driven, and the risk of collision between the head 300 and the object 100 can be reduced.

Aspect 3

According to Aspect 3, in Aspect 1 or 2, the controller 500 calculates the percentages of a region in which drawing is to be performed and another region in which no drawing is to be performed based on drawing data used in the ink discharge to the object 100 and increases the excitation current of the first Z-direction driver 92 based on the percentages.

According to Aspect 3, the gap between the object 100 and the head 300 is widened in the region with no drawing data, thereby reducing the risk of collision.

Aspect 4

According to Aspect 4, in Aspect 2 or 3, the controller 500 calculates the region in which an abnormality is to occur during the ink discharge to the object 100 based on the three dimensional coordinate data indicating the shape of the object 100, calculates the percentages of a region in which drawing is to be performed and another region in which no drawing is to be performed based on drawing data used in the ink discharge to the object 100, and selectively determines whether to increase the excitation current of the first Z-direction driver 92 in the region in which an abnormality is to occur and whether to increase the excitation current of the first Z-direction driver 92 based on the percentages.

According to Aspect 4, a user can select the normal mode or the risk reduction mode.

Aspect 5

According to Aspect 5, in any one of Aspects 1 to 4, the first Z-direction driver 92 includes the drive motor.

According to Aspect 5, the carriage 1 can be finely moved relative to the object 100.

Aspect 6

According to Aspect 6, in any one of Aspects 1 to 4, the second Z-direction driver 93 includes the power cylinder.

According to Aspect 6, the head 300 can be moved at high speed relative to the carriage 1.

As described above, according to the present disclosure, the liquid discharge apparatus can be provided that reduces power consumption in operation.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. A liquid discharge apparatus comprising:

a liquid discharge portion having a liquid discharge port, configured to perform a liquid discharge to discharge a liquid in a liquid discharge direction from the liquid discharge port toward an object;

a liquid discharge unit configured to hold the liquid discharge portion, the liquid discharge unit being movable along the liquid discharge direction;

a first driver configured to move the liquid discharge unit along the liquid discharge direction;

a second driver configured to move the liquid discharge portion relative to the liquid discharge unit along the liquid discharge direction;

an abnormality detector configured to detect an abnormality of the liquid discharge unit; and circuitry configured to:

increase an excitation current of the first driver in response to an abnormality detection signal from the abnormality detector or an instruction to clean the liquid discharge portion; and drive the second driver after increasing the excitation current.

2. The liquid discharge apparatus according to claim 1, wherein the circuitry is further configured to:

calculate a region in which an abnormality is to occur during the liquid discharge to the object based on coordinate data indicating a shape of the object; and increase the excitation current of the first driver in the region.

3. The liquid discharge apparatus according to claim 1, wherein the circuitry is further configured to:

calculate percentages of a region in which drawing is to be performed and another region in which no drawing is to be performed based on drawing data used in the liquid discharge to the object; and increase the excitation current of the first driver based on the percentages.

4. The liquid discharge apparatus according to claim 1, wherein the circuitry is further configured to:

calculate a region in which an abnormality is to occur during the liquid discharge to the object based on coordinate data indicating a shape of the object;

calculate percentages of a region in which drawing is to be performed and another region in which no drawing is to be performed based on drawing data used in the liquid discharge to the object; and selectively determine whether to increase the excitation current of the first driver in the region in which the abnormality is to occur and whether to increase the excitation current of the first driver based on the percentages.

5. The liquid discharge apparatus according to claim 1, wherein the first driver includes a drive motor.

6. The liquid discharge apparatus according to claim 1, wherein the second driver includes a power cylinder.

7. The liquid discharge apparatus according to claim 1, wherein the liquid discharge unit is movable along at least one of a first axis and a second axis intersecting the first axis and movable along a third axis intersecting the first axis and the second axis, the third axis being parallel to the liquid discharge direction.

8. A liquid discharge method comprising:

discharging a liquid in a liquid discharge direction from a liquid discharge port of a liquid discharge portion held by a liquid discharge unit;

detecting an abnormality of the liquid discharge unit;

increasing an excitation current of a first driver in response to an abnormality detection signal or an instruction to clean the liquid discharge portion, the first driver configured to move the liquid discharge unit along the liquid discharge direction; and driving a second driver after the increasing the excitation current, the second driver configured to move the liquid discharge portion relative to the liquid discharge unit along the liquid discharge direction.

* * * * *